US012647694B2

(12) United States Patent
Saito et al.

(10) Patent No.: US 12,647,694 B2
(45) Date of Patent: Jun. 2, 2026

(54) PHOTOELECTRIC CONVERSION DEVICE, PHOTOELECTRIC CONVERSION SYSTEM, AND SIGNAL PROCESSING METHOD

(71) Applicant: CANON KABUSHIKI KAISHA, Tokyo (JP)

(72) Inventors: Makiko Saito, Tokyo (JP); Hideaki Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 18/437,708

(22) Filed: Feb. 9, 2024

(65) Prior Publication Data

US 2024/0284065 A1     Aug. 22, 2024

(30) Foreign Application Priority Data

Feb. 20, 2023     (JP) ................................. 2023-024206

(51) Int. Cl.
H04N 25/671          (2023.01)
H04N 25/63           (2023.01)
H04N 25/633          (2023.01)
H04N 25/77           (2023.01)

(52) U.S. Cl.
CPC ........... H04N 25/671 (2023.01); H04N 25/77 (2023.01)

(58) Field of Classification Search
CPC ...... H04N 25/77; H04N 25/671; H04N 25/63; H04N 25/633; H10F 39/1515; H10F 39/8057; H10F 77/331
See application file for complete search history.

(56) References Cited

U.S. PATENT DOCUMENTS

| | | | |
|---|---|---|---|
| 6,900,837 B2 * | 5/2005 | Muramatsu ............ H04N 25/78 348/243 |
| 7,098,950 B2 * | 8/2006 | Yamamoto ........... H04N 23/651 348/243 |
| 7,538,804 B2 | 5/2009 | Okita |
| 7,557,847 B2 | 7/2009 | Okita |
| 7,872,677 B2 * | 1/2011 | Kume ................. H04N 25/633 348/243 |

(Continued)

FOREIGN PATENT DOCUMENTS

| | | |
|---|---|---|
| JP | 2008-67060 A | 3/2008 |
| JP | 2009-17036 A | 1/2009 |

(Continued)

*Primary Examiner* — Marly S Camargo
(74) *Attorney, Agent, or Firm* — VENABLE LLP

(57)     ABSTRACT

According to one embodiment, a photoelectric conversion device comprises: a pixel array including a plurality of pixels arranged in a matrix form, the plurality of pixels including an effective pixel that outputs a signal corresponding to incident light and a light-shielded pixel having a light-shielding member; a calculation unit that calculates a correction value based on a pixel value of the light-shielded pixel; and a correction unit that corrects a pixel value of the effective pixel based on the correction value, wherein a pixel row of the pixel array includes a first light-shielded pixel, a second light-shielded pixel, and the effective pixel, and wherein the calculation unit calculates the correction value using different parameters for each of the first light-shielded pixel and the second light-shielded pixel in the pixel row.

19 Claims, 12 Drawing Sheets

(56) References Cited

U.S. PATENT DOCUMENTS

| | | | |
|---|---|---|---|
| 9,153,610 | B2 | 10/2015 | Kobayashi |
| 9,445,026 | B2 | 9/2016 | Kobayashi |
| 9,955,092 | B2 | 4/2018 | Saito |
| 10,992,886 | B2 | 4/2021 | Yamazaki |
| 11,310,453 | B2 | 4/2022 | Takada |
| 11,924,566 | B2 * | 3/2024 | Takahashi ................ G02B 7/34 |
| 2009/0086051 | A1 | 4/2009 | Hagiwara |
| 2018/0255258 | A1 * | 9/2018 | Shin .................... H04N 25/633 |
| 2022/0201233 | A1 | 6/2022 | Takada |
| 2023/0188868 | A1 | 6/2023 | Saito |

FOREIGN PATENT DOCUMENTS

| | | | |
|---|---|---|---|
| JP | 2009-81767 | A | 4/2009 |
| JP | 2012-114782 | A | 6/2012 |

* cited by examiner

FIG. 7

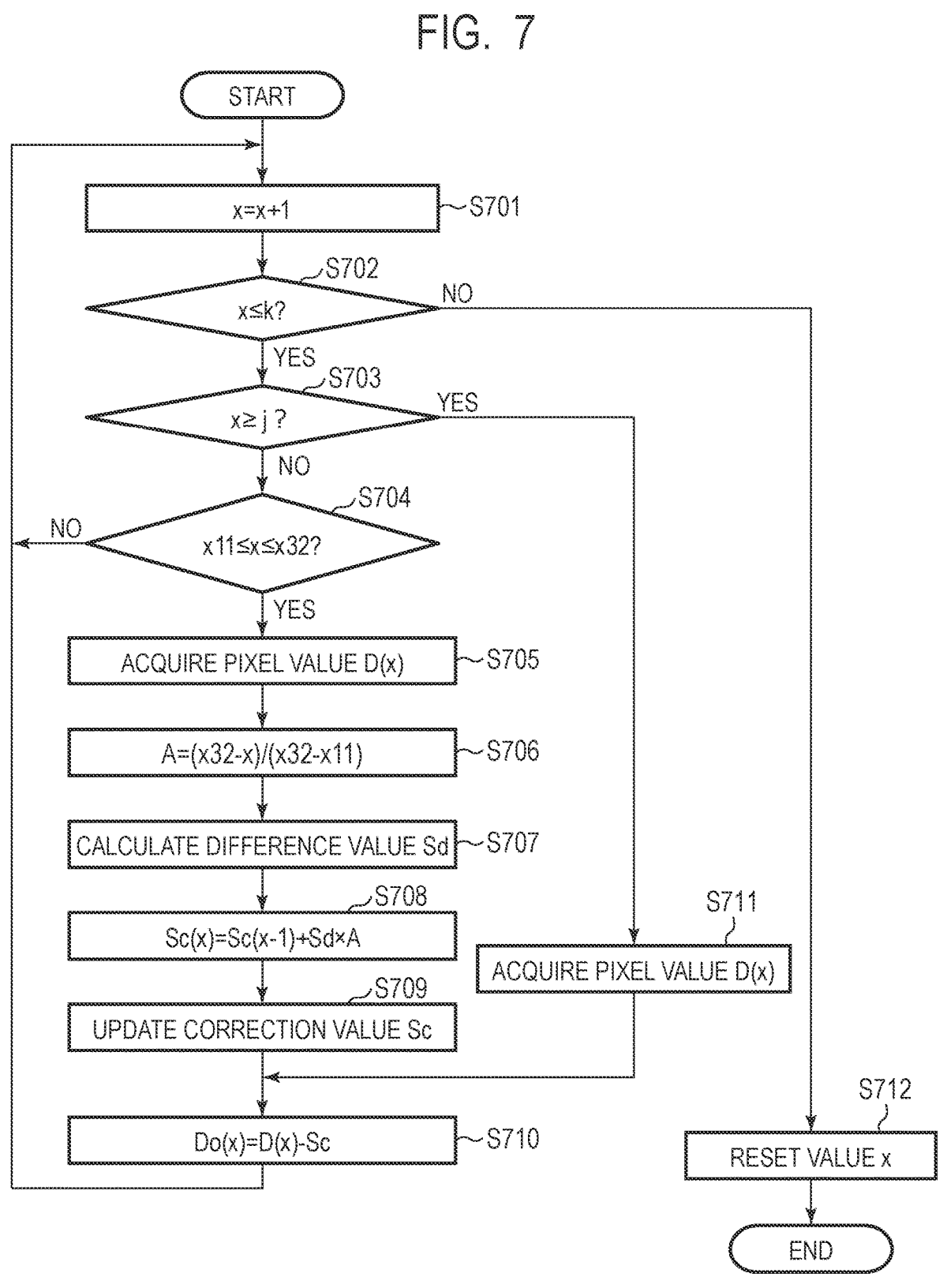

START x=x+1 ~S701

S702
x≤k?  NO

YES
S703
x≥ j ?  YES

NO

S704
x11≤x≤x32?  NO

YES

ACQUIRE PIXEL VALUE D(x) ~S705

A=(x32-x)/(x32-x11) ~S706

CALCULATE DIFFERENCE VALUE Sd ~S707

S708
Sc(x)=Sc(x-1)+Sd×A

S709
UPDATE CORRECTION VALUE Sc

S711
ACQUIRE PIXEL VALUE D(x)

Do(x)=D(x)-Sc ~S710

S712
RESET VALUE x

END

FIG. 9

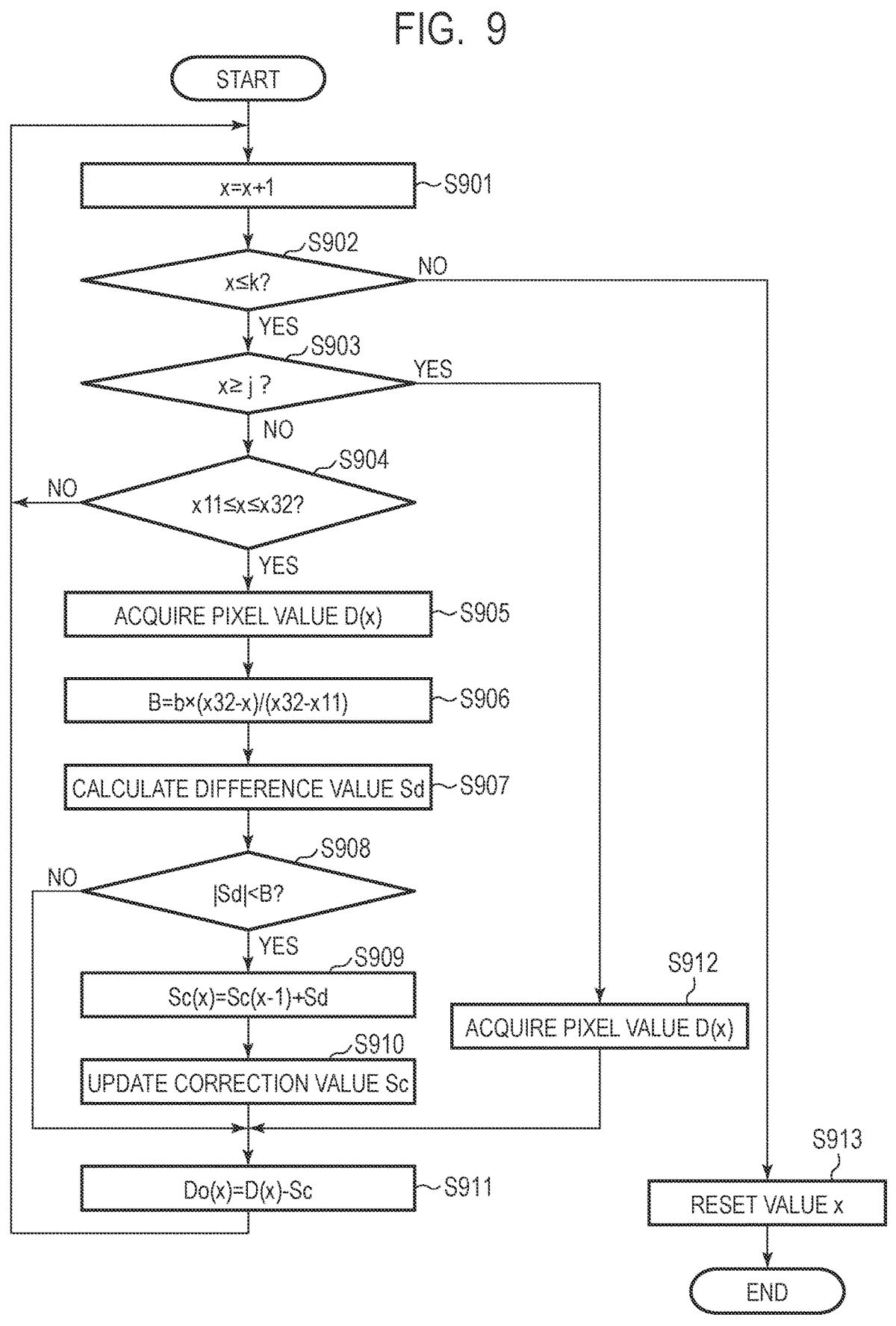

START x=x+1 ~S901

S902
x≤k? — NO

YES
S903
x≥j? — YES

NO
S904
x11≤x≤x32? — NO

YES

ACQUIRE PIXEL VALUE D(x) ~S905

B=b×(x32-x)/(x32-x11) ~S906

CALCULATE DIFFERENCE VALUE Sd ~S907

S908
|Sd|<B? — NO

YES
Sc(x)=Sc(x-1)+Sd ~S909

UPDATE CORRECTION VALUE Sc ~S910

S912
ACQUIRE PIXEL VALUE D(x)

Do(x)=D(x)-Sc ~S911

S913
RESET VALUE x

END

PHOTOELECTRIC CONVERSION DEVICE, PHOTOELECTRIC CONVERSION SYSTEM, AND SIGNAL PROCESSING METHOD

BACKGROUND

Field

The present disclosure relates to a photoelectric conversion device, a photoelectric conversion system, and a signal processing method.

Description of the Related Art

Japanese Patent Application Laid-Open No. 2008-067060 discloses a photoelectric conversion device that corrects an image value using a correction value attenuated by multiplying a coefficient and an offset obtained for each row based on a pixel value of a light-shielded pixel region (horizontal OB region).

According to the photoelectric conversion device described in Japanese Patent Application Laid-Open No. 2008-067060, however, the image value may not be properly corrected.

SUMMARY

It is an object of the present disclosure to provide a photoelectric conversion device and a photoelectric conversion system capable of more properly correcting an image value.

According to one embodiment, a photoelectric conversion device includes: a pixel array including a plurality of pixels arranged in a matrix form, the plurality of pixels including an effective pixel that outputs a signal corresponding to incident light and a light-shielded pixel having a light-shielding member; a calculation unit that calculates a correction value based on a pixel value of the light-shielded pixel; and a correction unit that corrects a pixel value of the effective pixel based on the correction value, wherein a pixel row of the pixel array includes a first light-shielded pixel, a second light-shielded pixel, and the effective pixel, and wherein the calculation unit calculates the correction value using different parameters for each of the first light-shielded pixel and the second light-shielded pixel in the pixel row.

Further features of the present disclosure will become apparent from the following description of exemplary embodiments with reference to the attached drawings.

BRIEF DESCRIPTION OF THE DRAWINGS

FIG. 7 illustrates a flowchart showing the operation of the clamp circuit according to the second embodiment.

FIG. 9 illustrates a flowchart showing the operation of the clamp circuit according to the fourth embodiment.

DESCRIPTION OF THE EMBODIMENTS

Figure 1:
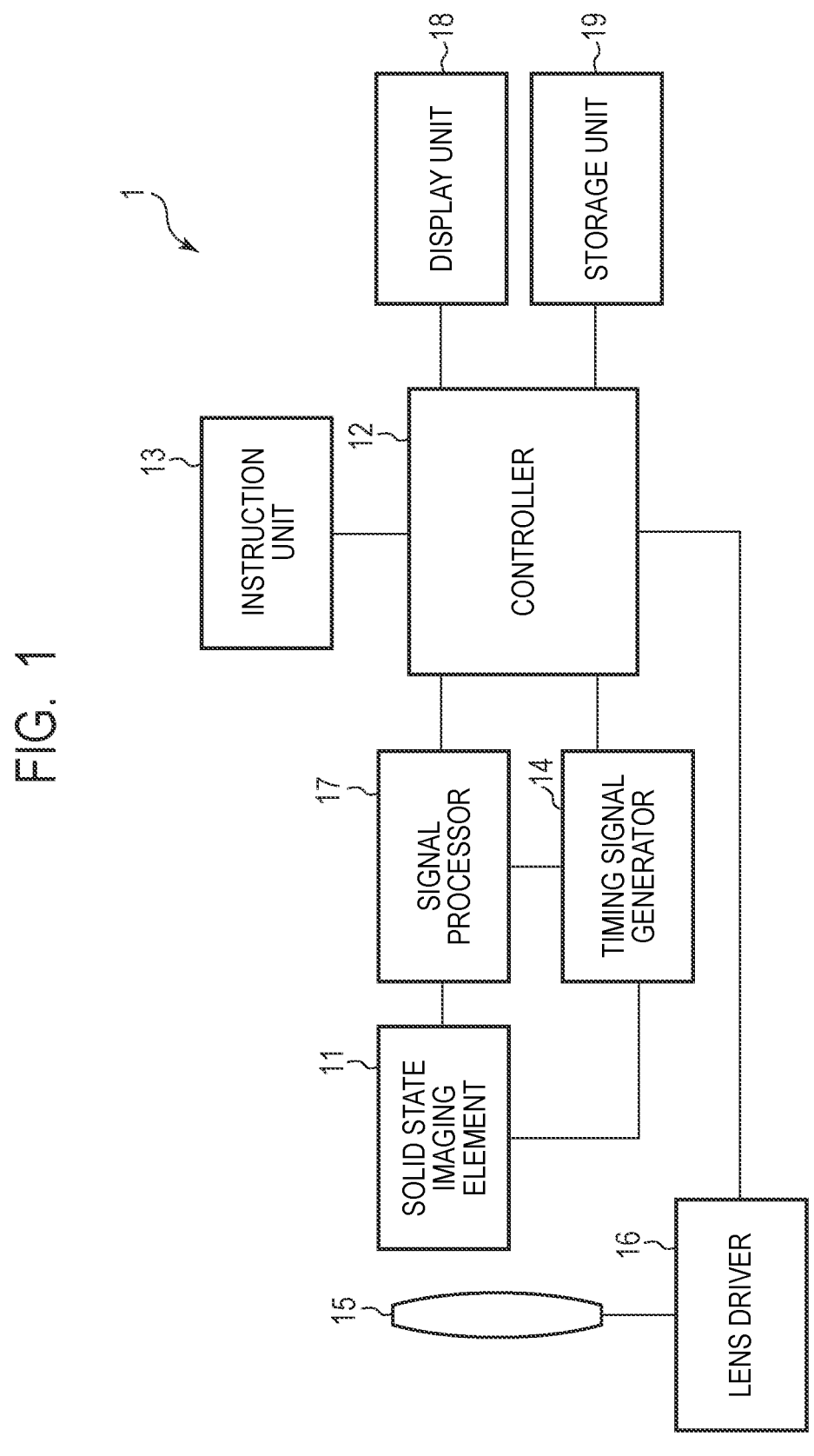
FIG. 1 illustrates a block diagram of a photoelectric conversion device according to the first embodiment.

Each embodiment will be described below with reference to the drawings. In the description of each embodiment, the same components as those of other embodiments may be indicated by the same reference numerals and the description thereof may be omitted.

First Embodiment

FIG. 1 illustrates a block diagram of a photoelectric conversion device 1 according to the first embodiment. The photoelectric conversion device 1 includes a solid-state imaging element 11, a controller 12, an instruction unit 13, a timing signal generator 14, a photographic lens 15, a lens driver 16, a signal processor 17, a display unit 18, and a storage unit 19. The photoelectric conversion device 1 may be an imaging device for imaging an object.

The solid-state imaging element 11 includes a pixel region including multiple pixels two-dimensionally arranged in a matrix. The solid-state imaging element 11 can output imaging signal data corresponding to incident light. The detailed configuration of the solid-state imaging element 11 will be described later.

The instruction unit 13 receives an instruction from a user or the like for executing photographing, setting of a driving mode of the photoelectric conversion device 1, and the like. The instruction unit 13 transmits a received input to the controller 12.

The controller 12 includes a storage unit in which drive information and the like for driving the photoelectric conversion device 1 are stored. The controller 12 controls the operation of each functional block of the photoelectric conversion device 1 based on the driving information and an instruction via the instruction unit 13. Further, the controller 12 performs signal processing such as development processing and compression processing for generating an image for recording or for reproduction based on the captured image signal data.

The timing signal generator 14 receives a control signal from the controller 12. The timing signal generator 14 generates a timing signal for driving the solid-state imaging element 11 and the signal processor 17 based on the input control signal.

The photographic lens 15 forms an optical image of a subject on the solid-state imaging element 11. The photographic lens 15 may be configured to be detachable from the photoelectric conversion device 1, or may be configured not to be detachable from the photoelectric conversion device 1.

The lens driver 16 drives the photographic lens 15 based on a control signal input from the controller 12. The lens driver 16 controls focus, zoom, aperture, and the like based on the control signal input from the controller 12.

The signal processor 17 performs signal processing such as correction on the imaging signal data output from the solid-state imaging element 11. The display unit 18 displays an image for reproduction, information on setting of a driving mode of the photoelectric conversion device 1, and the like. The storage unit 19 includes a recording medium (not shown) and stores image data for recording in the recording medium. As a recording medium provided in the storage unit 19, for example, a semiconductor memory such as a flash memory is used. The recording medium may be configured to be detachable from the storage unit 19, or may be configured not to be detachable from the storage unit 19.

Figure 2:
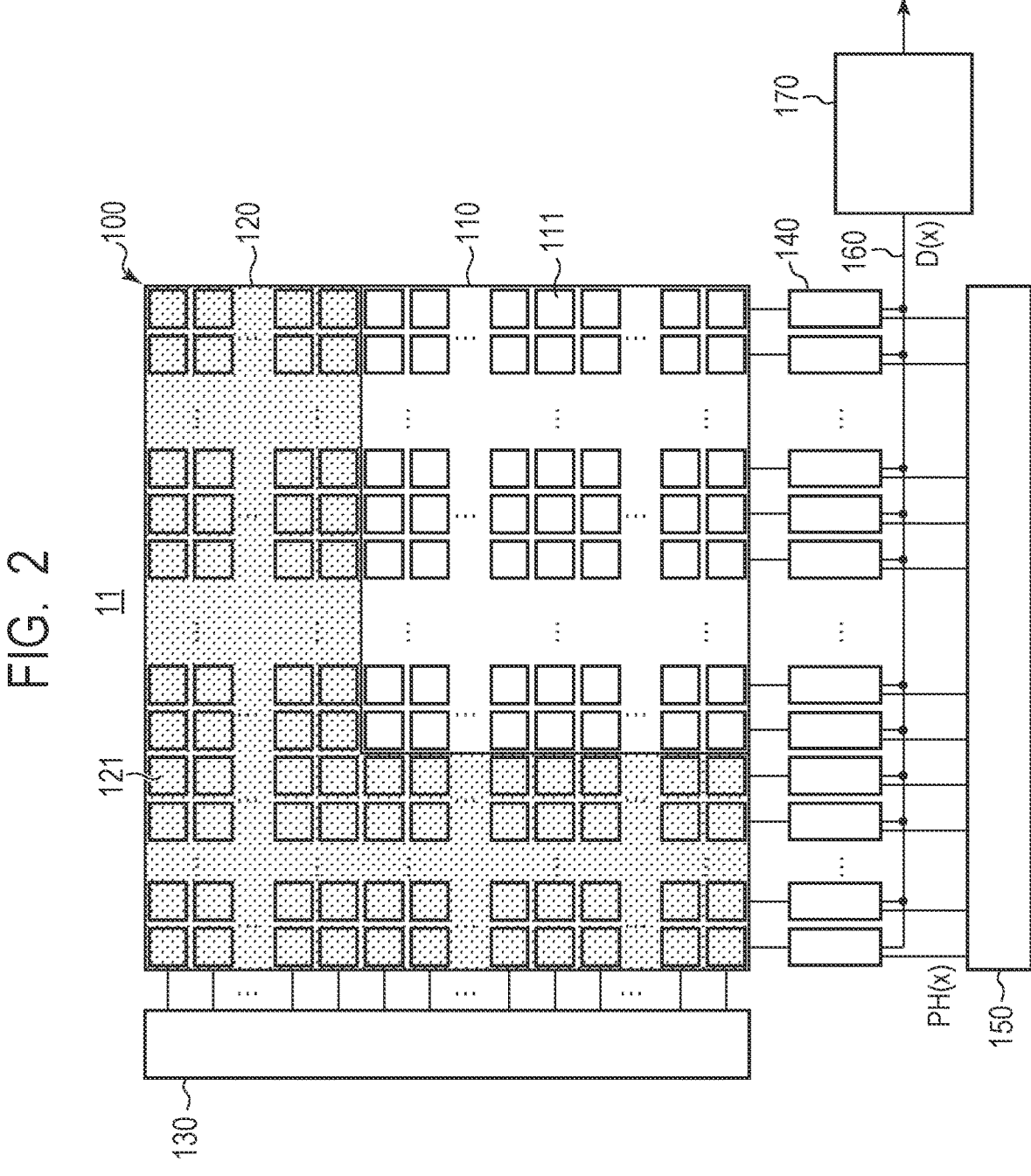
FIG. 2 illustrates a block diagram of the solid-state imaging device according to the first embodiment.

FIG. 2 illustrates a block diagram of the solid-state imaging element 11 according to the first embodiment. The solid-state imaging element 11 includes a pixel array 100, a vertical scanning circuit 130, a column circuit 140, a horizontal scanning circuit 150, a horizontal output line 160, and a clamp circuit 170.

As shown in FIG. 2, the pixel array 100 includes multiple pixels arranged in a matrix. The pixel array 100 includes an effective pixel region 110 and a light-shielded pixel region 120. In the effective pixel region 110, multiple effective pixels 111 are arranged in a matrix. The effective pixel 111 includes a photoelectric conversion unit, and outputs an analog signal corresponding to the light incident on a light-receiving portion of the photoelectric conversion unit. The output signal from the effective pixel 111 is used to generate and display a captured image. The light-shielded pixel region 120 is provided adjacent to the effective pixel region 110. In the light-shielded pixel region 120, there are multiple light-shielded pixels 121 including a first light-shielded pixel and a second light-shielded pixel. The light-shielded pixel 121 includes a photoelectric conversion unit similarly to the effective pixel 111. A light-receiving portion of the photoelectric conversion unit of the light-shielded pixel 121 is shielded from incident light by a light-shielding member or the like. A pixel signal from the light-shielded pixel 121 is used to correct the pixel signal of the effective pixel 111. The light-shielded pixel region 120 may include a HOB (Horizontal Optical Black) pixel region composed of multiple columns of light-shielded pixels, and a VOB (Vertical Optical Black) pixel region composed of multiple rows of light-shielded pixels. However, in the present embodiment, the VOB pixel region may not necessarily be provided.

The vertical scanning circuit 130 supplies a control signal to multiple pixels in each row of the pixel array 100 to select multiple pixels included in each row. That is, the vertical scanning circuit 130 controls the timing of reading out the pixel signals output from the effective pixel 111 and the light-shielded pixel 121 in units of rows based on the timing signal input from the timing signal generator 14.

The column circuit 140 is arranged to correspond to each pixel column including the effective pixel 111 and the light-shielded pixel 121. The column circuit 140 includes an AD converter. The AD converter converts an analog signal level corresponding to a pixel signal transmitted from each pixel column into a digital signal value (pixel value). The column circuit 140 includes a storage unit. The column circuit 140 temporarily holds a pixel value converted by the AD conversion unit.

The horizontal scanning circuit 150 is connected to each of the column circuits 140. The horizontal scanning circuit 150 outputs a selection signal PH to the column circuit 140 based on the timing signal input from the timing signal generator 14. The horizontal scanning circuit 150 selects the column circuit 140 according to the selection signal PH, and controls the timing of outputting the digital signal value from the storage unit of the column circuit 140. In response to the selection signal PH(x) corresponding to the x-th column turning to high level, the column circuit 140 of the x-th column is selected. The selected column circuit 140 outputs the digital signal value held in the storage unit to the clamp circuit 170.

The horizontal output line 160 electrically connects the column circuit 140 and the clamp circuit 170. The digital signal value output from the column circuit 140 is output to the clamp circuit 170 via the horizontal output line 160.

The clamp circuit 170 includes a calculation unit and a correction unit. The clamp circuit 170 receives pixel values from the column circuits 140 via the horizontal output line 160. The clamp circuit 170 calculates a correction value used for correction of the pixel value of the effective pixel 111 based on the input pixel value. The clamp circuit 170 uses the calculated correction value to correct the pixel value input from the column circuit 140.

The clamp circuit 170 receives the pixel value from the light-shielded pixel 121, and updates the correction value based on the received pixel value. The detailed operation of the clamp circuit 170 will be described later.

Figure 3:
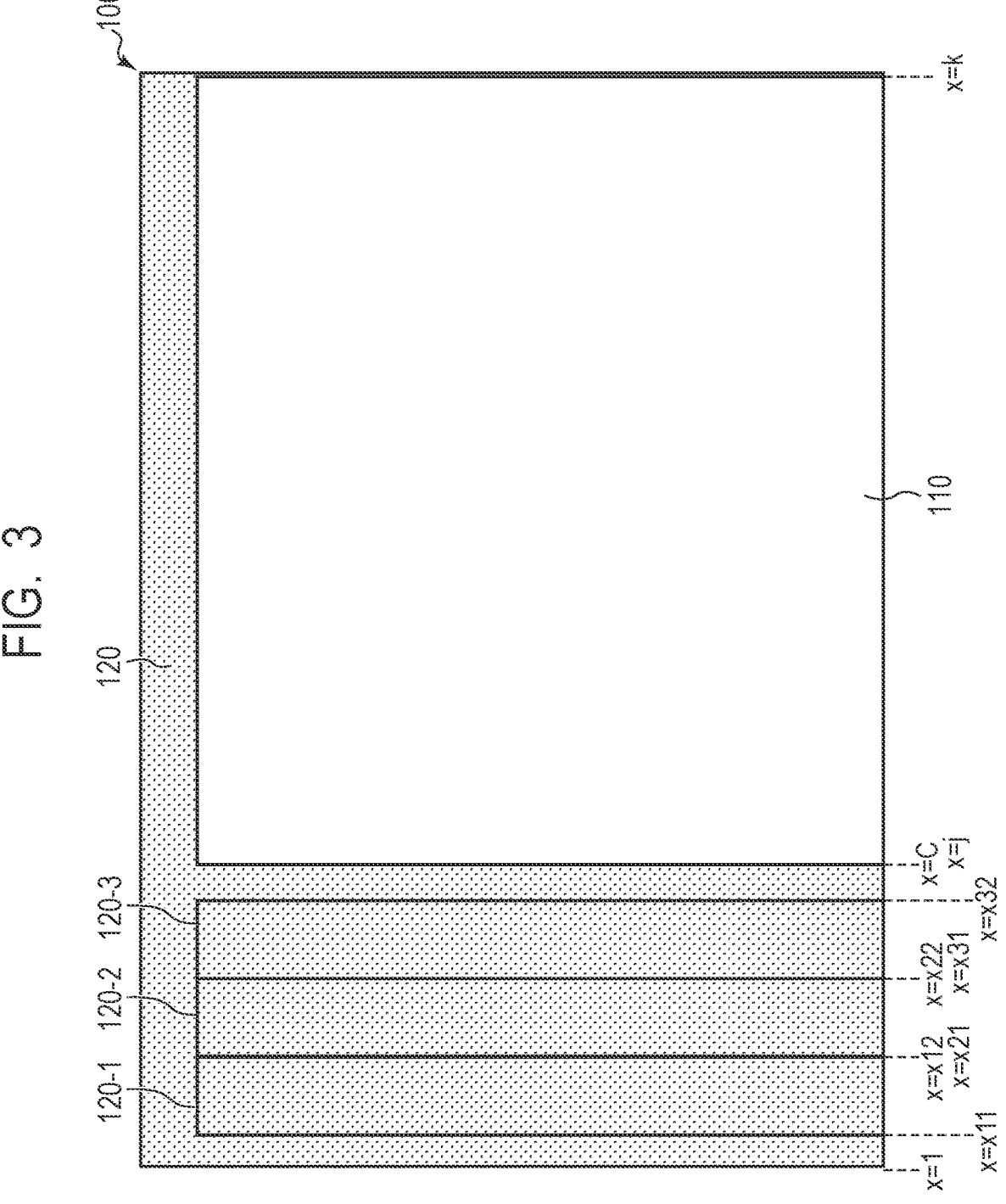
FIG. 3 illustrates a schematic diagram of a pixel array according to the first embodiment.

The operation of reading a signal from the solid-state imaging element 11 according to the present embodiment will be described with reference to FIGS. 3 and 4. FIG. 3 illustrates a schematic diagram of the pixel array 100 according to the first embodiment.

As shown in FIG. 3, the light-shielded pixel region 120 is provided adjacent to the effective pixel region 110. The light-shielded pixel region 120 includes pixel columns of the light-shielded pixels 121 from the first column to the C-th column. The effective pixel region 110 includes pixel columns of effective pixels 111 from the j-th column to the k-th column. That is, the pixel array 100 according to the present embodiment includes a total of k pixel columns.

The light-shielded pixel region 120 includes a first light-shielded pixel region 120-1, a second light-shielded pixel region 120-2, and a third light-shielded pixel region 120-3. The first light-shielded pixel region 120-1 includes pixel columns of light-shielded pixels 121 (a plurality of first light-shielded pixels) in the x11-th to x12-th columns, and is adjacent to the second light-shielded pixel region 120-2. The second light-shielded pixel region 120-2 includes pixel columns (a plurality of second light-shielded pixels) of the light-shielded pixels 121 in the x21-th to x22-th columns, and is adjacent to the third light-shielded pixel region 120-3. The third light-shielded pixel region 120-3 includes pixel columns of the light-shielded pixels 121 in the x31-th column to the x32-th column. In the example shown in FIG. 3, each of the first light-shielded pixel region 120-1, the second light-shielded pixel region 120-2, and the third light-shielded pixel region 120-3 includes a plurality of pixel columns. The x11-th column may be the first column, and the x32-th column may be the C-th column. The range occupied by the effective pixel region 110 and the light-shielded pixel region 120 in the pixel array 100 shown in FIG. 3 is a schematic example. The number of effective pixel regions 110 and light-shielded pixel regions 120 is not limited to the number of regions shown in FIG. 3, and may be two or four or more. Further, the number of columns of pixels included in each of the first to third light-shielded pixel regions 120-1 to 120-3 may be different from each other, or may be same as each other.

Each pixel column in the first to k-th columns included in the pixel array 100 is associated with a column address. The x11-th to x12-th columns are associated with the first light-shielded pixel region 120-1, and the x21-th to x22-th columns are associated with the second light-shielded pixel region 120-2. The x31-th to x32-th columns are associated with the third light-shielded pixel region 120-3, and the j-th to k-th columns are associated with the effective pixel region 110. Information indicating the correspondence between the numbers of the pixel columns and the column addresses is stored in, for example, a storage unit arranged in the controller 12. Further, the column address of the pixel column used for updating the correction value Sc is stored in the storage unit. For example, the address corresponding to the x11-th column may be stored as a column address to be read first at the start of the updating process of the correction value Sc. In addition, the address corresponding to the x32-th column can be stored as a column address to be read last in the updating process of the correction value Sc. When the solid-state imaging element 11 is driven, the photoelectric conversion device 1 controls the solid-state imaging element 11 based on drive information including information of stored column address. Further, another pixel column may be arranged between the x12-th column and the x21-th column, and another pixel column may be arranged between the x22-th column and the x31-th column. The column number of the pixel column included in the pixel array 100 can be used as the column address.

Figure 4:
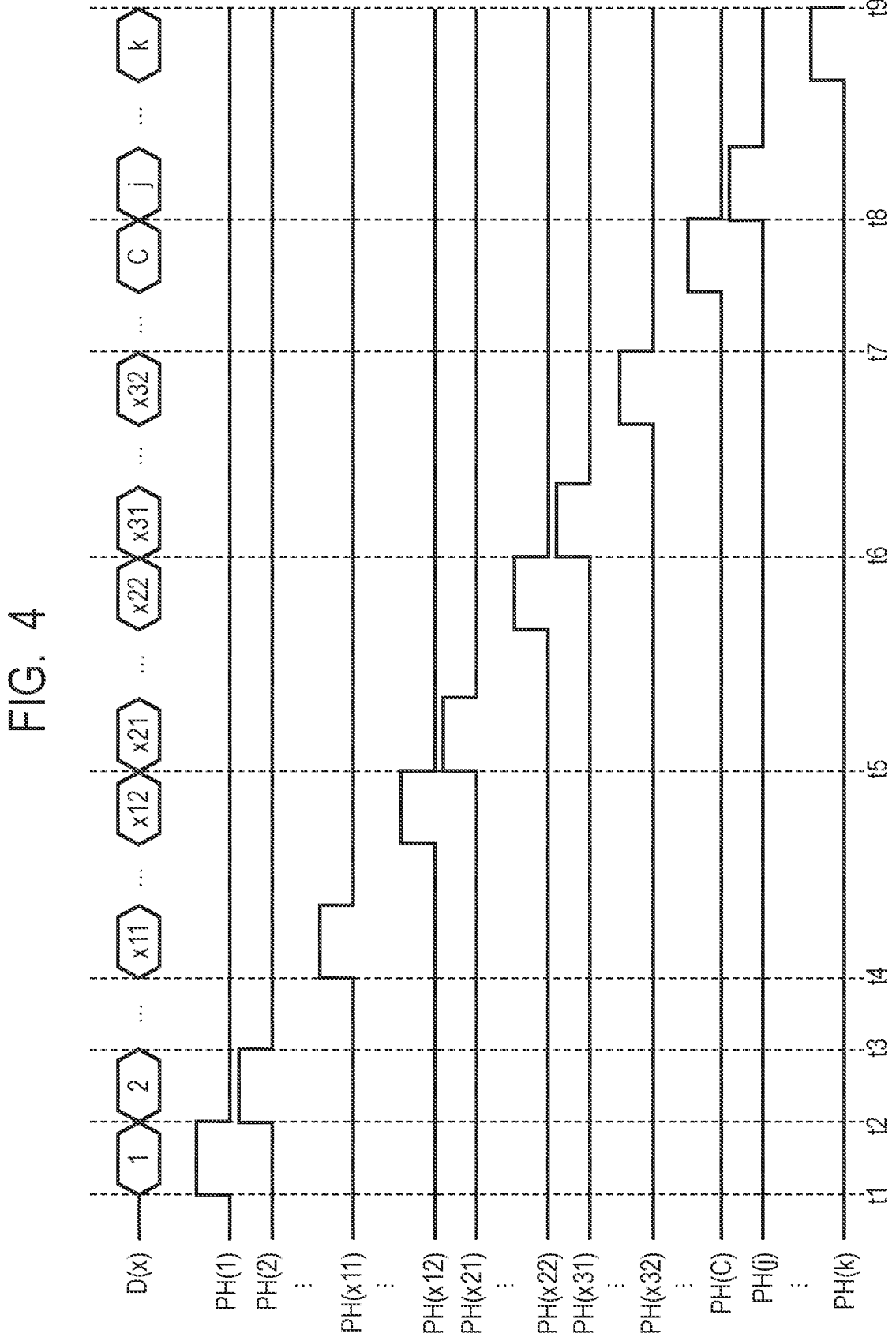
FIG. 4 illustrates a timing chart showing a read operation in the first embodiment.

FIG. 4 illustrates a timing chart showing a reading operation in the first embodiment. That is, FIG. 4 shows the operation of reading out pixel signals from each column in an arbitrary scanning row (one pixel row) of the pixel array 100.

At a time before the time t1 (not shown), the column circuit 140 reads the pixel signals of the effective pixel 111 and the light-shielded pixel 121. The column circuit 140 converts each of the read pixel signals into an analog-digital (AD) signal. The column circuit 140 holds the A/D converted pixel values D(1) to D(k) in a memory of the column circuit 140.

At time t1, the selection signal PH(1) transitions from a low level to a high level. The column circuit 140 corresponding to the first column is selected based on PH(1) that has transitioned to the high level. The selected column circuit 140 holds the pixel value D(1) of the light-shielded pixel 121 included in the first column. The selected column circuit 140 outputs the pixel value D(1) to the clamp circuit 170 based on the selection signal PH(1).

At time t2, the selection signal PH(1) transitions from high level to low level, and the selection signal PH(2) transitions from low level to high level. The column circuit 140 corresponding to the second column is selected based on the PH(2) transitioned to the high level. The selected column circuit 140 holds the pixel value D(2) of the light-shielded pixel 121 included in the second column. The selected column circuit 140 sequentially outputs the pixel value D(2) to the clamp circuit 170 based on the selection signal PH(2). At time t3, the selection signal PH(2) transitions from high level to low level, and the selection signal PH(3) transitions from low level to high level. At times t4 to t9 after the time t3, the selection signal PH sequentially transitions from the low level to the high level, and the corresponding column circuit 140 outputs the held pixel value D to the clamp circuit 170. Specifically, at times t4 to t5, the column circuit 140 sequentially outputs the pixel values D(x11) to D(x12) of the light-shielded pixels 121 included in the x11-th to x12-th columns to the clamp circuit 170. At times t5 to t6, the column circuit 140 sequentially outputs the pixel values D(x21) to D(x22) of the light-shielded pixels 121 included in the x21-th column to the x22-th column to the clamp circuit 170. At times t6 to t7, the column circuit 140 sequentially outputs the pixel values D(x31) to D(x32) of the light-shielded pixels 121 included in the x31-th column to the x32-th column to the clamp circuit 170. At times t8 to t9, the column circuit 140 sequentially outputs the pixel values D(j) to D(k) of the effective pixels 111 included in the j-th to k-th columns to the clamp circuit 170. The vertical scanning circuit 130 outputs a signal for selecting the next row to the corresponding pixels. In the selected pixel row, pixel values D from the first column to the k-th column are sequentially read out and output to the clamp circuit 170 by the same procedure as the reading operation executed for the previously scanned pixel row.

As shown in FIG. 4, the horizontal scanning circuit 150 sequentially selects the column circuits 140 corresponding to the first to k-th columns by transitioning the selection signals PH(1) to PH(k) from the low level to the high level. The selected column circuit 140 sequentially outputs the held pixel values D(1) to D(k) to the clamp circuit 170 based on the selection signals PH(1) to PH(k). That is, the pixel signals are scanned while sequentially switching the selected columns from the first column to the k-th column of the pixel array 100. In the pixel row including the effective pixels 111, after the first light-shielded pixel region 120-1 is scanned, the second light-shielded pixel region 120-2 is scanned. After the second light-shielded pixel region 120-2 is scanned, the third light-shielded pixel region 120-3 is scanned. After the pixel values are read out from the first to third light-shielded pixel regions 120-1 to 120-3, the pixel values of the effective pixels 111 are read out.

Figure 5:
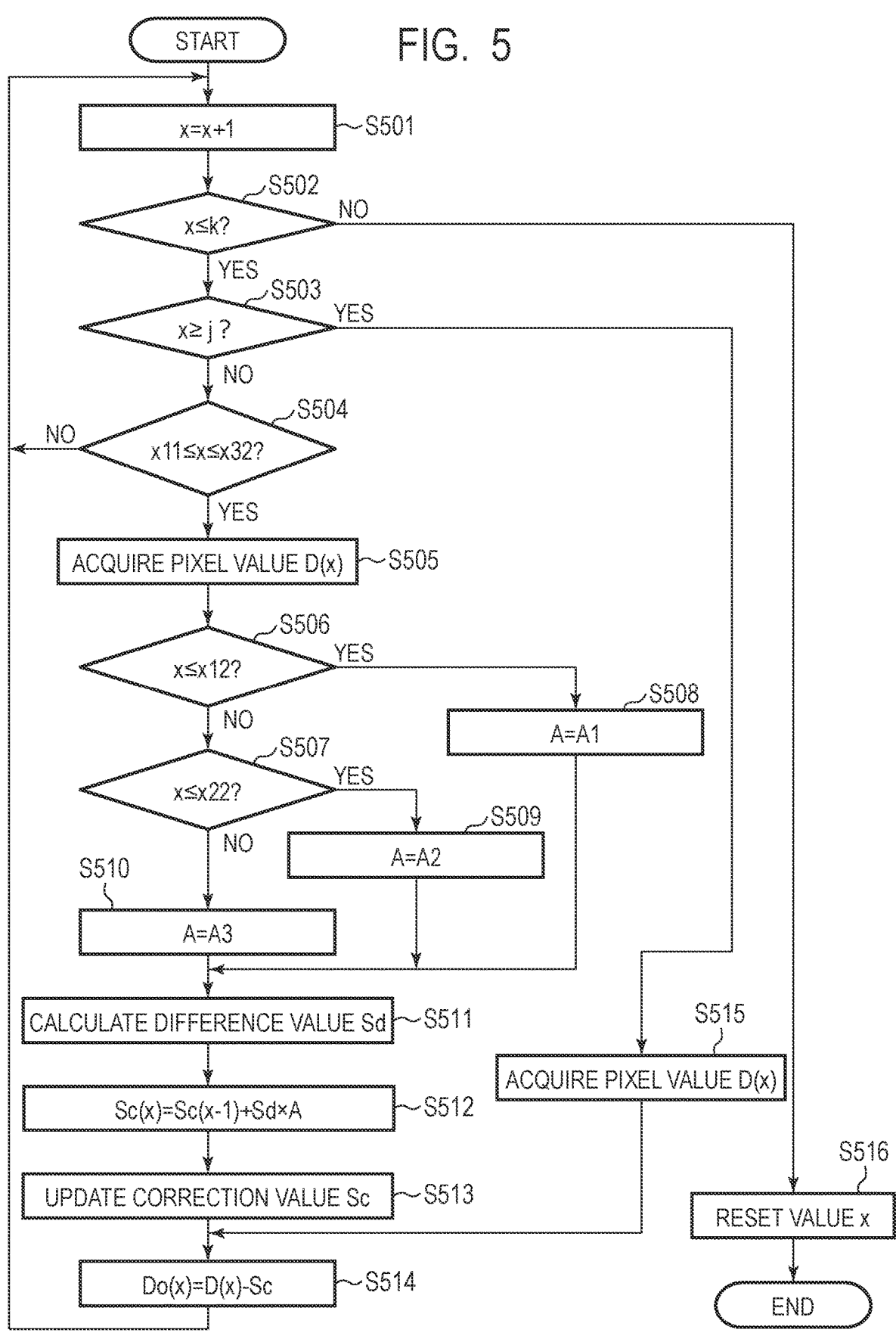
FIG. 5 illustrates a flowchart showing the operation of the clamp circuit according to the first embodiment.

FIG. 5 illustrates a flowchart showing the operation of the clamp circuit 170 according to the first embodiment. The clamp circuit 170 calculates a correction value Sc for correcting the pixel value of the effective pixel 111 based on the pixel values D(x11) to D(x32). The clamp circuit 170 corrects the pixel values D(j) to D(k) of the effective pixels 111 using the calculated correction value Sc. The calculation processing of the correction value Sc and the correction processing of the pixel value D(x) in the scanning row (one pixel row) will be described below.

As shown in FIG. 4, the clamp circuit 170 reads out the pixel values D(1) to D(k) from the column circuit 140. That is, the pixel values D(1) to D(k) held in the column circuit 140 are sequentially input to the clamp circuit 170 from the first column to the k-th column of the pixel region 110. The clamp operation is performed in the clamp circuit 170 while a signal is input to the clamp circuit 170. The reading operation of the pixel values D(1) to D(k) from the column circuit 140 is executed in step S505 or step S515 of FIG. 5 described later.

In step S501, the clamp circuit 170 adds "1" to a count value x of the column address. In step S502, the clamp circuit 170 determines whether or not the count value x indicates a pixel column in the pixel array 100. Specifically, if the count value x is equal to or less than the total number of pixels (total number of pixels "k") included in the scanning row (YES in step S502), the clamp circuit 170 determines that there is a pixel signal read out from the column circuit 140, and advances the processing to step S503. On the other hand, if the count value x exceeds the total number of pixels k (NO in step S502), the clamp circuit 170 determines that the inputting process of the pixel signals from the scan row to the clamp circuit 170 is completed, and the process proceeds to step S516.

In step S503, the clamp circuit 170 determines whether or not the count value x corresponds to a pixel column in the effective pixel region 110. Specifically, the clamp circuit 170 compares the count value x with a column address j indicating the first pixel column of the effective pixel region 110. If the count value x is less than j (NO in step S503), the clamp circuit 170 determines that the pixel signal can be used for updating the correction value Sc, and advances the processing to step S504. On the other hand, if the count value x is equal to or greater than j (YES in step S503), the clamp circuit 170 determines that the count value x indicates a column address in the effective pixel region 110. That is, the clamp circuit 170 determines that the pixel signal is not used for updating the correction value Sc, and advances the processing to step S515.

In step S504, the clamp circuit 170 determines whether or not the count value x corresponds to a pixel column included in the first to third light-shielded pixel regions 120-1 to 120-3. Specifically, the clamp circuit 170 compares the count value x with the column addresses x11, x32. If the count value x corresponds to a column address between the column address x11 and the column address x32 (YES in step S504), the clamp circuit 170 determines that the pixel signal is used for updating the correction value Sc, and advances the processing to step S505. On the other hand, if the count value x does not correspond to a column address between the column address x11 and the column address x32 (NO in step S504), the clamp circuit 170 determines that the pixel signal is not used for updating the correction value Sc, and returns the processing to step S501.

In step S505, the clamp circuit 170 acquires the pixel value D(x) of the pixel column corresponding to the count value x from the column circuit 140. In step S506, the clamp circuit 170 determines whether or not the count value x corresponds to a pixel column included in the first light-shielded pixel region 120-1. Specifically, the clamp circuit 170 compares the count value x with the column address x12. If the count value x is equal to or smaller than the column address x12 (YES in step S506), the clamp circuit 170 determines that the pixel signal corresponds to a light-shielded pixel included in the first light-shielded pixel region 120-1, and advances the processing to step S508. On the other hand, if the count value x is greater than the column address x12 (NO in step S506), the clamp circuit 170 determines that the pixel signal corresponds to a light-shielded pixel included in other region than the first light-shielded pixel region 120-1, and advances the processing to step S507.

In step S507, the clamp circuit 170 determines whether or not the count value x corresponds to a pixel column included in the second light-shielded pixel region 120-2. Specifically, the clamp circuit 170 compares the count value x with the column address x22. If the count value x is equal to or smaller than the column address x22 (YES in step S507), the clamp circuit 170 determines that the pixel signal corresponds to a light-shielded pixel included in the second light-shielded pixel region 120-2, and advances the processing to step S509. On the other hand, if the count value x is greater than the column address x22 (NO in step S507), the clamp circuit 170 determines that the pixel signal corresponds to a light-shielded pixel included in other region than the second light-shielded pixel region 120-2, and advances the processing to step S510.

In step S508, the clamp circuit 170 sets parameters used for calculating the correction value. In the present embodiment, the parameter to be set is an attenuation coefficient A that is used to determine an attenuation factor for attenuating a difference between the correction values before and after updating the correction value Sc. That is, the attenuation factor of the present disclosure varies according to the attenuation coefficient A. In this embodiment, the attenuation factor becomes greater as the attenuation coefficient A is set to be lower, and becomes smaller as the attenuation coefficient A is set to be greater. The clamp circuit 170 sets an attenuation coefficient A1 corresponding to the first light-shielded pixel region 120-1 as the attenuation coefficient A, and advances the processing to step S511.

In step S509, the clamp circuit 170 sets an attenuation coefficient A2 corresponding to the second light-shielded pixel region 120-2 as the attenuation coefficient A, and advances the processing to step S511. In step S510, the clamp circuit 170 sets an attenuation coefficient A3 corresponding to the third light-shielded pixel region 120-3 as the attenuation coefficient A, and advances the processing to step S511. In this embodiment, a different attenuation coefficient A is set for each of the first to third light-shielded pixel regions 120-1 to 120-3. Specifically, each attenuation coefficient is set to satisfy the following relation, A1>A2>A3. As an example, each attenuation coefficient may be set to A1=0.8, A2=0.4, and A3=0.2.

In step S511, the clamp circuit 170 calculates a difference value Sd using the pixel value D(x). Specifically, the clamp circuit 170 subtracts a target pixel value Dt from the pixel value D(x). Further, the clamp circuit 170 further subtracts a correction value Sc(x−1) calculated in the light-shielded pixel of the (x−1)-th column from the pixel value D(x). That is, the difference value Sd according to the present embodiment can be calculated by the following equation (1).

$$Sd = D(x) - Dt - Sc(x-1) \tag{1}$$

If the x-th column is the pixel column scanned first in the light-shielded pixel region 120 and the scanning row is the pixel row scanned first in the calculation of the correction value, the correction value Sc(x−1) is set to zero (0). In addition, although the x-th column is the pixel column scanned first in the light-shielded pixel region 120 but the correction value has already been calculated before the scanning of the scanning row, the correction value just before the scanning of the scanning row is set as the correction value Sc(x−1).

In step S512, the clamp circuit 170 sequentially updates the correction value Sc(x) of the x-th column based on the correction value Sc(x−1) of the (x−1)-th column. Specifically, the clamp circuit 170 adds a value obtained by multiplying the difference value Sd and the attenuation coefficient A to the correction value Sc(x−1). That is, according to the present embodiment, the correction value Sc(x) for the light-shielded pixel included in the x-th column can be calculated by the following equation (2).

$$Sc(x) = Sc(x-1) + Sd \times A \tag{2}$$

The correction value Sc(x) according to the equation (2) is set as a correction value Sc(x) that is based on the pixel value of the light-shielded pixel 121 included in the x-th column.

In step S513, the clamp circuit 170 sets the correction value Sc(x) calculated in step S512 as an updated correction value Sc. In step S514, the clamp circuit 170 corrects the pixel value D(x) based on the correction value Sc updated in step S513. The clamp circuit 170 subtracts the updated correction value Sc from the pixel value D(x) to output the pixel value Do(x). Then, the clamp circuit 170 repeats the processing of steps S501 to S514 to start the processing for the next pixel value to be input. After the update of the correction value based on the pixel signals from the light-shielded pixels 121 is completed, the clamp circuit 170 holds the correction value Sc updated last in step S512. After the correction value is updated in step S513, the process can be returned to step S501 without executing step S514.

If the count value x indicates a pixel column in the effective pixel region 110 in step S503 (YES in step S503), the clamp circuit 170 acquires the pixel value D(x) of the effective pixel 111 from the column circuit 140 (step S515). Then, the clamp circuit 170 subtracts the correction value Sc from the pixel value D(x) of the effective pixel 111 (step S514). That is, the clamp circuit 170 corrects an offset of the pixel value D(x) of the effective pixel 111. After correcting the pixel value D(x), the clamp circuit 170 executes the process of step S501 again to start the process for the next input pixel value.

If the count value x exceeds the total number of pixels k in step S502 (NO in step S502), the clamp circuit 170 determines that the input of the pixel signals of the scanning row is completed. In step S516, the clamp circuit 170 resets the count value x, and ends the processing of this flowchart. If there is a pixel row to be scanned next, the clamp circuit 170 executes the processing of this flowchart again to correct the pixel value based on the correction value Sc.

According to the present embodiment, different attenuation coefficients are set in each of multiple light-shielded pixel regions arranged in the horizontal direction. The correction value is updated based on the pixel signals of the light-shielded pixels and the attenuation coefficients. Here, a relatively low attenuation factor is applied to the light-shielded pixel region to be scanned first. A relatively high attenuation factor is applied to the light-shielded pixel region to be scanned later.

For example, white spot noise is known as one of noises appearing in an image captured by a photoelectric conversion device. The white spot noise is generated due to defects included in a semiconductor substrate used in an imaging apparatus, space beams existing in the atmosphere, and the like. Accordingly, the white spot noise appears in the captured image regardless of the spatial arrangement of the pixels and the order of reading out the signals. If the white spot noise is present in the light-shielded pixel region, a relatively large correction value can be calculated in order to cancel this noise. As a result, the captured pixel value is excessively corrected. This excessive correction may appear as horizontal stripe noise in the captured image. On the other hand, if a correction value is set in consideration of the white spot noise, the correction value may be excessively underestimated, and noise such as dark shading component may not be sufficiently removed. As a result, there may be a problem that noise due to a dark shading component or the like remains in the captured image.

According to the photoelectric conversion device of the present disclosure, if white spot noise is present in the light-shielded pixel region to which a relatively low attenuation factor is applied, the correction value set to be excessively large is renewed by the light-shielded pixel to be scanned thereafter. Thus, the correction value is gradually updated to a proper correction value. That is, even if a correction value that deviates from the ideal correction value due to generation of white spot noise is temporarily calculated, the correction value is updated again to the ideal correction value by repeatedly renewing the correction value thereafter. Therefore, the problem of generation of the horizontal stripe noise due to generation of the white spot noise is suppressed. That is, the photoelectric conversion device according to the present disclosure can properly correct various types of noise that can be generated on the solid-state imaging device by using the light-shielded pixels arranged in the light-shielded pixel regions.

On the other hand, if the white spot noise or the like is present in the light-shielded pixel region to which a relatively high attenuation factor is applied, a relatively small attenuation factor is applied to the pixel signal of the light-shielded pixel in the calculation of the correction value. That is, the influence of the white spot noise or the like on the correction value is reduced. Therefore, the problem of setting an excessive correction value due to generation of the white spot noise or the like is suppressed. Thus, the photoelectric conversion device according to the present disclosure can suppress generation of horizontal stripe noise due to improper correction values.

Second Embodiment

The photoelectric conversion device 1 according to the present embodiment will be described with reference to FIGS. 6 and 7. The present embodiment is different from the first embodiment in that the attenuation coefficient A is changed for each column address of a column pixel to be scanned. Hereinafter, the photoelectric conversion device 1 according to the present embodiment will be described mainly with respect to the differences from the first embodiment.

Figure 6:
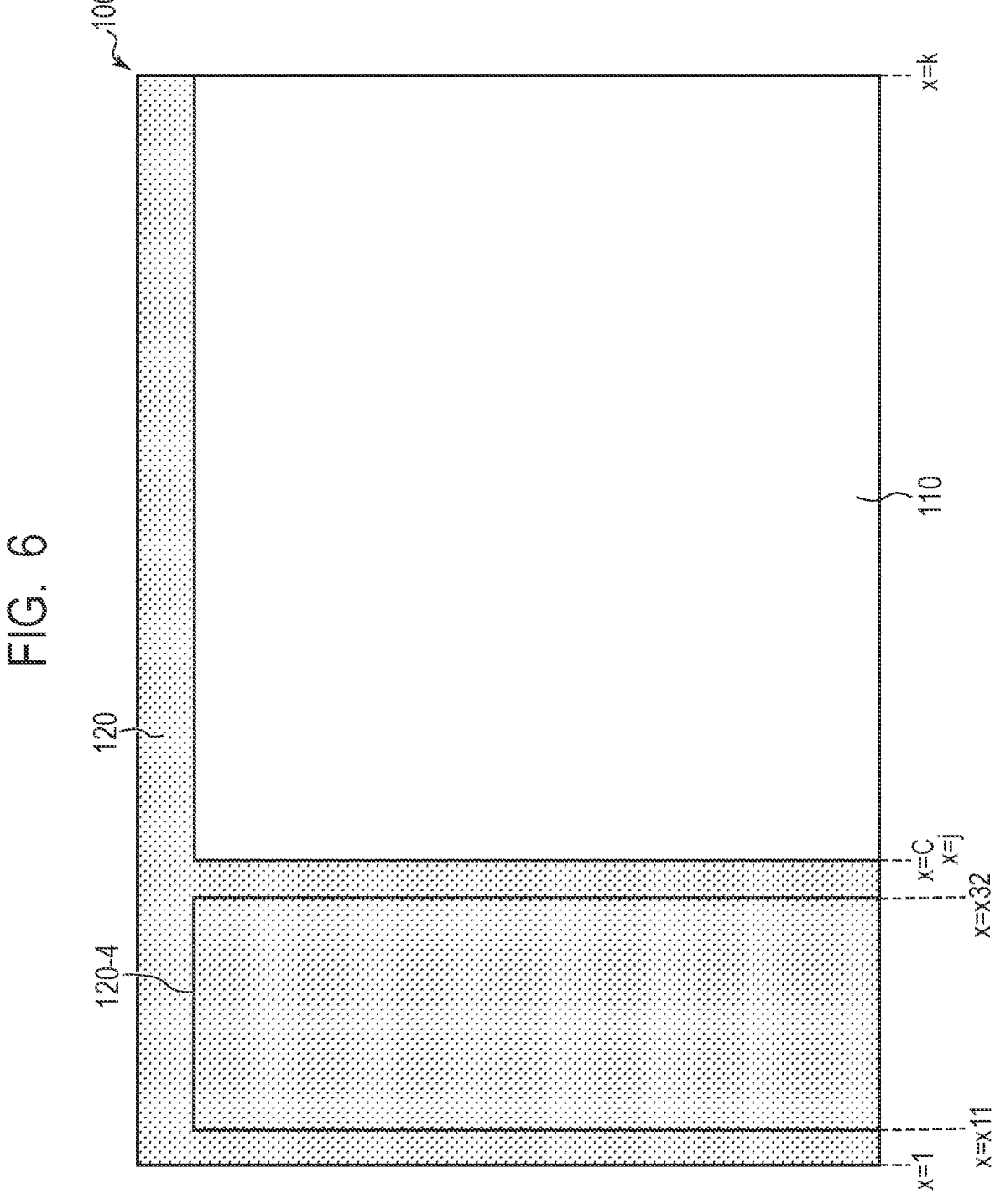
FIG. 6 illustrates a conceptual diagram of a pixel array according to the second embodiment.

FIG. 6 illustrates a schematic diagram of a pixel array 100 according to the second embodiment. Note that the descriptions of the same matters as in the configuration of FIG. 3 according to the first embodiment may be simplified or omitted.

As shown in FIG. 6, the light-shielded pixel region 120 is provided adjacent to the effective pixel region 110. The light-shielded pixel region 120 includes pixel columns of the light-shielded pixels 121 from the first column to the C-th column. The effective pixel region 110 includes pixel columns of effective pixels 111 from the j-th column to the k-th column. That is, the pixel array 100 according to the present embodiment includes a total of k pixel columns.

The light-shielded pixel region 120 according to the present embodiment includes a fourth light-shielded pixel region 120-4. The fourth light-shielded pixel region 120-4 includes pixel columns of the light-shielded pixels 121 in the x11-th to x32-th columns. The light-shielded pixels 121 in the fourth light-shielded pixel region 120-4 are used for updating the correction value. The x11-th column may be the first column, and the x32-th column may be the C-th column.

Each pixel column in the first to k-th columns included in the pixel array 100 is associated with a column address. The x11-th to x32-th columns are associated with the fourth light-shielded pixel region 120-4, and the j-th to k-th columns are associated with the effective pixel region 110. The column address of the pixel column used for updating the correction value Sc is stored in the storage unit of the controller 12. For example, the column address corresponding to the x11-th column may be recorded as an address to be first read at the start of the updating process of the correction value Sc. In addition, an address corresponding to the x32-th column can be recorded as a column address to be read at the end of the updating process of the correction value Sc. When the solid-state imaging element 11 is driven, the photoelectric conversion device 1 controls the solid-state imaging element 11 based on drive information including information of stored column addresses. The reading operation of pixel signals by the solid-state imaging element 11 in the present embodiment is same as the reading operation executed in the first embodiment shown in FIG. 4, and thus descriptions thereof are omitted.

FIG. 7 illustrates a flowchart showing the operation of the clamp circuit 170 according to the second embodiment. The clamp circuit 170 calculates the correction value Sc based on the pixel values D(x11) to D(x32). The clamp circuit 170 corrects the pixel values D(j) to D(k) of the effective pixels using the correction value Sc. The calculation processing of the correction value Sc and the correction processing of the pixel value D(x) in the scanning row (one pixel row) will be described below.

In step S701, the clamp circuit 170 adds "1" to the count value x of the column address. In step S702, the clamp circuit 170 determines whether or not the count value x indicates a pixel column included in the pixel array 100. Specifically, if the count value x is equal to or smaller than the total number of pixels k (YES in step S702), the clamp circuit 170 determines that there is a pixel signal to be read out from the column circuit 140, and advances the processing to step S703. On the other hand, if the count value x exceeds the total number of pixels k (NO in step S702), the clamp circuit 170 determines that the input of the pixel signal from the scan row to the clamp circuit 170 is completed, and advances the processing to step S712.

In step S703, the clamp circuit 170 determines whether or not the count value x corresponds to a pixel column included in the effective pixel region 110. Specifically, the clamp circuit 170 compares the count value x with the column address j of the effective pixel region 110. If the count value x is less than j (NO in step S703), the clamp circuit 170 determines that the pixel signal can be used for updating the correction value Sc, and advances the processing to step S704. On the other hand, if the count value x is equal to or greater than j (YES in step S703), the clamp circuit 170 determines that the count value x indicates a column address included in the effective pixel region 110. That is, the clamp circuit 170 determines that the pixel signal is not used for updating the correction value Sc, and advances the processing to step S711.

In step S704, the clamp circuit 170 determines whether or not the count value x corresponds to a pixel column included in the fourth light-shielded pixel region 120-4. Specifically, the clamp circuit 170 compares the count value x with the column addresses x11, x32. If the count value x corresponds to a column address between the column address x11 and the column address x32 (YES in step S704), the clamp circuit 170 determines that the pixel signal is used for updating the correction value Sc, and advances the processing to step S705. On the other hand, if the count value x does not correspond to a column address between the column address x11 and the column address x32 (NO in step S704), the clamp circuit 170 determines that the pixel signal is not used for updating the correction value Sc, and returns the processing to step S701.

In step S705, the clamp circuit 170 acquires the pixel value D(x) from the column circuit 140. In step S706, the clamp circuit 170 sets a parameter used for calculating the correction value. The parameter to be set is the attenuation coefficient A as in the first embodiment. In this embodiment, the clamp circuit 170 calculates the attenuation coefficient A using the count value x as a variable. For example, the attenuation coefficient A can be calculated by the following equation (3) including a column address x11 (x1-th column) and a column address x32 (x2-th column).

$$A = (x32 - x)/(x32 - x11) \qquad (3)$$

That is, the attenuation coefficient A can be set to a different value for each pixel column using the above equation (3).

In step S707, the clamp circuit 170 calculates the difference value Sd using the pixel value D(x). Specifically, similarly to the first embodiment, the clamp circuit 170 can calculate the difference value Sd based on the above equation (1). That is, the clamp circuit 170 subtracts the target pixel value Dt and the correction value Sc(x−1) from the pixel value D(x) to obtain the difference value Sd.

In step S708, the clamp circuit 170 sequentially updates the correction value Sc(x) of the x-th column based on the correction value Sc(x−1) of the (x−1)-th column. Specifically, as in the first embodiment, the correction value Sc(x) can be calculated based on the above equation (2). That is, the clamp circuit 170 adds a value obtained by multiplying the difference value Sd and the attenuation coefficient A to the correction value Sc(x−1). The correction value Sc(x) calculated by the above equation (2) is set as a correction value Sc(x) that is based on the pixel value of the light-shielded pixel 121 in the x-th column.

In step S709, the clamp circuit 170 sets the correction value Sc(x) calculated in step S708 as an updated correction value Sc. In step S710, the clamp circuit 170 corrects the pixel value D(x) based on the correction value Sc updated in step S709. The clamp circuit 170 subtracts the updated correction value Sc from the pixel value D(x) to output the pixel value Do(x). Then, the clamp circuit 170 repeats the processing of steps S701 to S710 to start the processing for the next input pixel value. After the update of the correction value based on the pixel signal from the light-shielded pixel 121 is completed, the clamp circuit 170 holds the correction value Sc updated last in step S709. After the correction value is updated in step S709, the process can be returned to step S701 without executing step S710.

If the count value x indicates a pixel column included in the effective pixel region 110 in step S703 (YES in step S703), the clamp circuit 170 acquires the pixel value D(x) of the effective pixel 111 from the column circuit 140 (step S711). Then, the clamp circuit 170 subtracts the correction value Sc from the pixel value D(x) of the effective pixel 111 (step S710). That is, the clamp circuit 170 corrects an offset of the pixel value D(x) of the effective pixel 111. After correcting the pixel value D(x), the clamp circuit 170 executes the process of step S701 again to start the process for the next pixel value to be input.

In step S702, if the count value x exceeds the total number of pixels k (NO in step S702), the clamp circuit 170 determines that the input of the pixel signals of the scanning row is completed. In step S712, the clamp circuit 170 resets the count value x, and ends the processing of this flowchart. If there is a pixel row to be scanned next, the clamp circuit 170 executes the processing of this flowchart again to correct the pixel value based on the correction value Sc.

According to the present embodiment, different attenuation coefficients are assigned to for every pixel column of the light-shielded pixels. Therefore, the correction value is updated with higher accuracy, and the pixel value of the effective pixel can be corrected with an ideal correction value. Thus, the photoelectric conversion device according to the present embodiment can further effectively suppress the problem of generation of the horizontal stripe noise due to the white spot noise or the like.

Third Embodiment

The photoelectric conversion device 1 according to the present embodiment will be described with reference to FIGS. 3 and 8. The present embodiment is different from the first embodiment in that a threshold B is applied to each pixel signal from the light-shielded pixel region. Hereinafter, the photoelectric conversion device 1 according to the present embodiment will be described mainly with respect to the differences from the first embodiment. Since the configuration of the light-shielded pixel region 120 and the signal reading operation by the solid-state imaging element 11 according to the present embodiment are the same as those in the first embodiment, descriptions thereof will be omitted.

Figure 8:
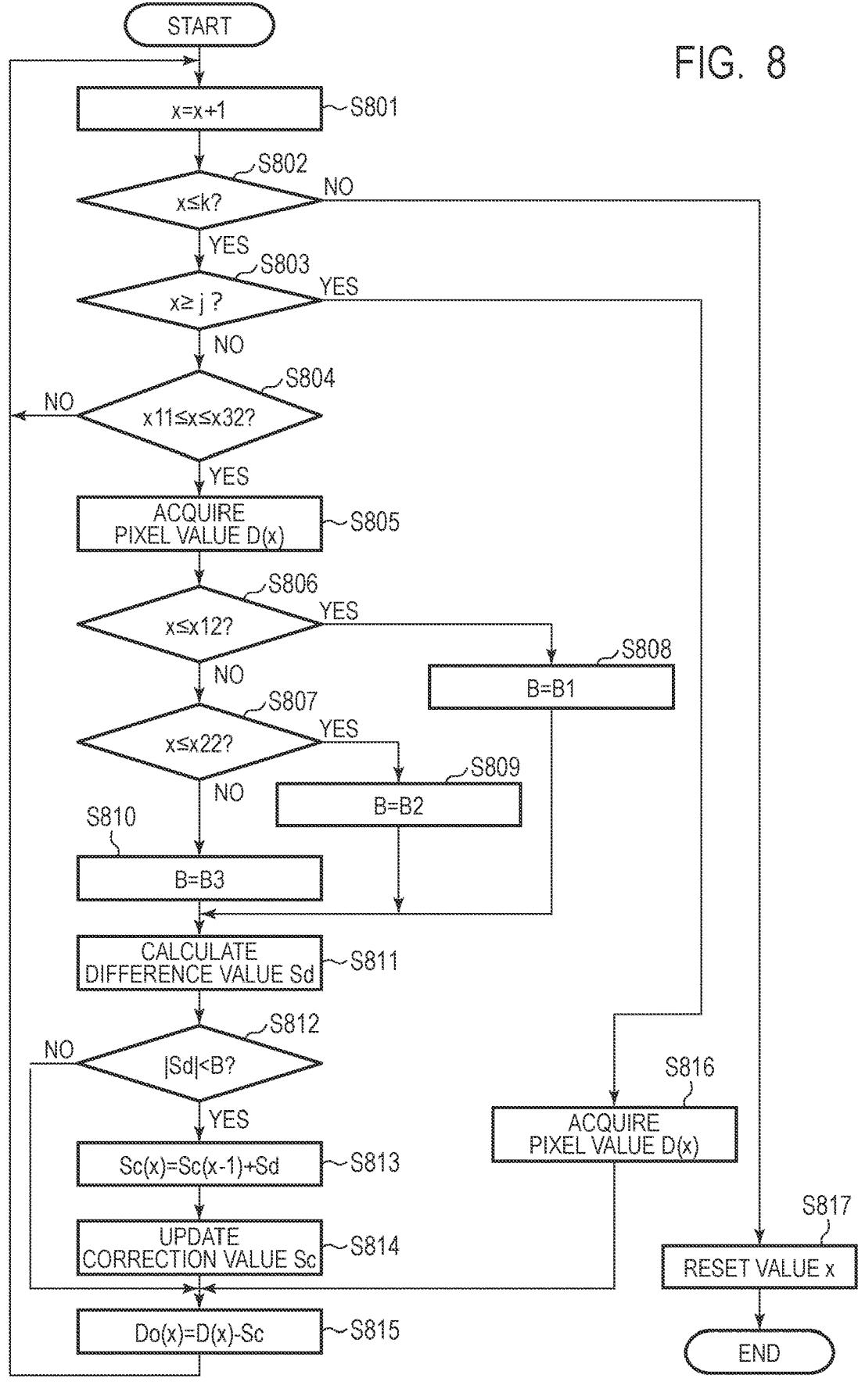
FIG. 8 illustrates a flowchart showing the operation of the clamp circuit according to the third embodiment.

FIG. 8 illustrates a flowchart showing the operation of the clamp circuit 170 according to the third embodiment. The clamp circuit 170 calculates the correction value Sc based on the pixel values D(x11) to D(x32). The clamp circuit 170 corrects the pixel values D(j) to D(k) of the effective pixels 111 using the correction value Sc. The calculation processing of the correction value Sc and the correction processing of the pixel value D(x) in the scanning row (one pixel row) will be described below.

In step S801, the clamp circuit 170 adds "1" to the count value x of the column address. In step S802, the clamp circuit 170 determines whether or not the count value x indicates a pixel column in the pixel array 100. Specifically, if the count value x is equal to or smaller than the total number of pixels k (YES in step S802), the clamp circuit 170 determines that there is a pixel signal to be read out from the column circuit 140, and advances the processing to step S803. On the other hand, if the count value x exceeds the total number of pixels k (NO in step S802), the clamp circuit 170 determines that the input of the pixel signals from the scan row to the clamp circuit 170 is completed, and advances the processing to step S817.

In step S803, the clamp circuit 170 determines whether or not the count value x corresponds to a pixel column in the effective pixel region 110. Specifically, the clamp circuit 170 compares the count value x with the column address j of the effective pixel region 110. If the count value x is less than j (NO in step S803), the clamp circuit 170 determines that the pixel signal can be used for updating the correction value Sc, and advances the processing to step S804. On the other hand, if the count value x is equal to or greater than j (YES in step S803), the clamp circuit 170 determines that the count value x indicates a column address in the effective pixel region 110. That is, the clamp circuit 170 determines that the pixel signal is not used for updating the correction value Sc, and advances the processing to step S816.

In step S804, the clamp circuit 170 determines whether or not the count value x corresponds to a pixel column included in the first to third light-shielded pixel regions 120-1 to 120-3. Specifically, the clamp circuit 170 compares the count value x with the column addresses x11, x32. If the count value x corresponds to a column address between the column address x11 and the column address x32 (YES in step S804), the clamp circuit 170 determines that the pixel signal is used for updating the correction value Sc, and advances the processing to step S805. On the other hand, if the count value x does not correspond to a column address between the column address x11 and the column address x32 (NO in step S804), the clamp circuit 170 determines that the pixel signal is not used for updating the correction value Sc, and returns the processing to step S801.

In step S805, the clamp circuit 170 acquires the pixel value D(x) from the column circuit 140. In step S806, the clamp circuit 170 determines whether or not the count value x corresponds to a pixel column in the first light-shielded pixel region 120-1. Specifically, the clamp circuit 170 compares the count value x with the column address x12. If the count value x is equal to or smaller than the column address x12 (YES in step S806), the clamp circuit 170 determines that the pixel signal corresponds to a light-shielded pixel in the first light-shielded pixel region 120-1, and advances the processing to step S808. On the other hand, if the count value x is greater than the column address x12 (NO in step S806), the clamp circuit 170 determines that the pixel signal corresponds to a light-shielded pixel included in other region than the first light-shielded pixel region 120-1, and advances the processing to step S807.

In step S807, the clamp circuit 170 determines whether or not the count value x corresponds to a pixel column in the second light-shielded pixel region 120-2. Specifically, the clamp circuit 170 compares the count value x with the column address x22. If the count value x is equal to or smaller than the column address x22 (YES in step S807), the clamp circuit 170 determines that the pixel signal corresponds to a light-shielded pixel in the second light-shielded pixel region 120-2, and advances the processing to step S809. On the other hand, if the count value x is greater than the column address x22 (NO in step S807), the clamp circuit 170 determines that the pixel signal corresponds to a light-shielded pixel included in other region than the second light-shielded pixel region 120-2, and advances the processing to step S810.

In step S808, the clamp circuit 170 sets a parameter used for calculating the correction value. In the present embodiment, the parameter to be set is a threshold B used for determining whether or not to update the correction value. For example, the clamp circuit 170 may be configured not to update the correction value using a light-shielded pixel if a pixel value of that light-shielded pixel exceeds the absolute value of the set threshold. Further, the clamp circuit 170 may be configured not to update the correction value using the light-shielded pixel if the absolute value of the difference value exceeds a set threshold value. In the present embodiment, a threshold value B is set for the difference value. The clamp circuit 170 sets a threshold B1 corresponding to the first light-shielded pixel region 120-1, and advances the processing to step S811.

In step S809, the clamp circuit 170 sets a threshold value B2 corresponding to the second light-shielded pixel region 120-2 as the threshold value B, and advances the processing to step S811. In step S810, the clamp circuit 170 sets a threshold value B3 corresponding to the third light-shielded pixel region 120-3 as the threshold value B, and advances the processing to step S811. In the present embodiment, different threshold values are set for each of the first to third light-shielded pixel regions 120-1 to 120-3. Specifically, each threshold is set to have the relation of B1>B2>B3. As an example, each threshold may be set to: B1=128 [LSB]; B2=64 [LSB]; and B3=32 [LSB].

In step S811, the clamp circuit 170 calculates the difference value Sd using the pixel value D(x). Specifically, the clamp circuit 170 may calculate the difference value Sd based on the above equation (1) as in the first embodiment. That is, the clamp circuit 170 subtracts the target pixel value Dt and the correction value Sc(x−1) from the pixel value D(x) to obtain the difference value Sd.

In step S812, the clamp circuit 170 compares the difference value Sd with the threshold value B. If the absolute value of the difference value Sd is less than the threshold value B (YES in S812), the clamp circuit 170 determines that the pixel value D(x) is used for updating the correction value Sc, and advances the processing to step S813. On the other hand, if the absolute value of the difference value Sd is equal to or greater than the threshold value B (NO in S812), the clamp circuit 170 determines that the pixel value D(x) is not used for updating the correction value Sc, and advances the processing to step S815.

In step S813, the clamp circuit 170 sequentially updates the correction value Sc(x) of the x-th column based on the correction value Sc(x−1) of the (x−1)-th column. Specifically, the clamp circuit 170 adds the difference value Sd to the correction value Sc(x−1). That is, according to the present embodiment, the correction value Sc(x) obtained from the light-shielded pixel in the x-th column can be calculated by the following equation (4).

$$Sc(x) = Sc(x - 1) + Sd \qquad (4)$$

The correction value Sc(x) according to the above equation (4) is set as a correction value Sc(x) based on the pixel value of the light-shielded pixel 121 in the x-th column.

In step S814, the clamp circuit 170 sets the correction value Sc(x) calculated in step S813 as an updated correction value Sc. In step S815, the clamp circuit 170 corrects the pixel value D(x) based on the correction value Sc updated in step S814. The clamp circuit 170 subtracts the updated correction value Sc from the pixel value D(x) to output the pixel value Do(x). Then, the clamp circuit 170 repeats the processing of steps S801 to S815 to start the processing for the next input pixel value. After the update of the correction value based on the pixel signal from the light-shielded pixel 121 is completed, the clamp circuit 170 holds the correction value Sc updated last in step S814. After the correction value is updated in step S814, the process can be returned to step S801 without executing step S815. If the absolute value of the difference value Sd is equal to or greater than the threshold value B (NO in step S812), the process can be returned to step S801 without executing step S815.

If the count value x indicates a pixel column included in the effective pixel region 110 in step S803 (YES in step S803), the clamp circuit 170 acquires the pixel value D(x) of the effective pixel 111 from the column circuit 140 (step S816). Then, the clamp circuit 170 subtracts the correction value Sc from the pixel value D(x) of the effective pixel 111 (step S815). That is, the clamp circuit 170 corrects an offset of the pixel value D(x) of the effective pixel 111. After correcting the pixel value D(x), the clamp circuit 170 executes the processing of step S801 again to start the processing for the next pixel value to be input.

If the count value x exceeds the total number of pixels k in step S802 (NO in step S802), the clamp circuit 170 determines that the input of the pixel signals of the scanning row is completed. In step S817, the clamp circuit 170 resets the count value x, and ends the processing of this flowchart. If there is a pixel row to be scanned next, the clamp circuit 170 executes the processing of this flowchart again to correct the pixel value based on the correction value Sc.

According to the present embodiment, different threshold values are set for each of multiple light-shielded pixel regions arranged in the horizontal direction. If the difference value is less than the set threshold value, the correction value is updated based on the pixel signal of the light-shielded pixel. Here, a relatively high threshold value is applied to the light-shielded pixel region to be scanned first. A relatively low threshold is applied to the light-shielded pixel region to be scanned later. If a pixel value exceeding the threshold value is input, the pixel value is not used for updating the correction value.

By setting a relatively large threshold value to a part of the light-shielded pixel regions, the correction value is updated based on a pixel value even if the pixel value has a large amount of change due to random noise or the like. Accordingly, the correction using the light-shielded pixel region for random noise or the like is effectively executed. Further, if the white spot noise or the like is present in the light-shielded pixel region in which a relatively large threshold value is set, the correction value can be set to be excessively large. According to the present embodiment, the correction value set to be excessively large is gradually updated to a proper correction value by renewing the correction value using pixel values obtained from the light-shielded pixel regions to be scanned thereafter. Pixel signals having protruding values due to the white spot or the like are excluded in the process of updating the correction value by the set threshold value. Therefore, peculiar pixel signals due to the white spot noise and pixel values prominent in comparison with pixel values from peripheral pixels, or the like are not reflected in the correction value. Thus, influence of the random noise or the like can be effectively corrected, and generation of the horizontal stripe noise due to the white spot noise or the like can be suppressed.

Fourth Embodiment

The photoelectric conversion device 1 according to the present embodiment will be described with reference to FIGS. 6 and 9. The present embodiment is different from the third embodiment in that the threshold B is changed for each column address of column pixels to be scanned. Hereinafter, the photoelectric conversion device 1 according to the present embodiment will be described mainly with respect to the differences from the third embodiment. Since the configuration of the light-shielded pixel region 120 in the present embodiment is similar to that in the second embodiment, descriptions thereof will be omitted. Since the signal reading operation by the solid-state imaging element 11 is the same as that in the first embodiment, descriptions thereof will be omitted.

FIG. 9 illustrates a flowchart showing the operation of the clamp circuit 170 according to the fourth embodiment. The clamp circuit 170 calculates the correction value Sc based on the pixel values D(x11) to D(x32). The clamp circuit 170 corrects the pixel values D(j) to D(k) of the effective pixels using the correction value Sc. The calculation processing of the correction value Sc and the correction processing of the pixel value D(x) in the scanning row will be described below.

In step S901, the clamp circuit 170 adds "1" to the count value x of the column address. In step S902, the clamp circuit 170 determines whether or not the count value x indicates a pixel column in the pixel array 100. Specifically, if the count value x is equal to or smaller than the total number of pixels k (YES in step S902), the clamp circuit 170 determines that there is a pixel signal to be read out from the column circuit 140, and advances the processing to step S903. On the other hand, if the count value x exceeds the total number of pixels k (NO in step S902), the clamp circuit 170 determines that the input of the pixel signals from the scan row to the clamp circuit 170 is completed, and advances the processing to step S913.

In step S903, the clamp circuit 170 determines whether or not the count value x corresponds to a pixel column included in the effective pixel region 110. Specifically, the clamp circuit 170 compares the count value x with the column address j of the effective pixel region 110. If the count value x is less than j (NO in step S903), the clamp circuit 170 determines that the pixel signal can be used for updating the correction value Sc, and advances the processing to step S904. On the other hand, if the count value x is equal to or greater than j (YES in step S903), the clamp circuit 170 determines that the count value x indicates a column address within the effective pixel region 110. That is, the clamp circuit 170 determines that the pixel signal is not used for updating the correction value Sc, and advances the processing to step S912.

In step S904, the clamp circuit 170 determines whether or not the count value x corresponds to a pixel column included in the fourth light-shielded pixel region 120-4. Specifically, the clamp circuit 170 compares the count value x with the column addresses x11, x32. If the count value x corresponds to a column address between the column address x11 and the column address x32 (YES in step S904), the clamp circuit 170 determines that the pixel signal is used for updating the correction value Sc, and advances the processing to step S905. On the other hand, if the count value x does not correspond to a column address between the column address x11 and the column address x32 (NO in step S904), the clamp circuit 170 determines that the pixel signal is not used for updating the correction value Sc, and returns the processing to step S901.

In step S905, the clamp circuit 170 acquires the pixel value D(x) from the column circuit 140. In step S906, the clamp circuit 170 sets a parameter used for calculating the correction value. In the present embodiment, the parameter to be set is the threshold value B as in the third embodiment. The clamp circuit 170 calculates the threshold B using the count value x as a variable. For example, the threshold value B can be calculated by the following equation (5) including an allowable maximum value b and the column addresses x11, x32.

$$B = b \times (x32 - x)/(x32 - x11) \tag{5}$$

That is, the threshold value B can be set to a different value for each pixel column using the above equation (5).

In step S907, the clamp circuit 170 calculates the difference value Sd using the pixel value D(x). Specifically, similarly to the first embodiment, the clamp circuit 170 can calculate the difference value Sd based on the above equation (1). That is, the clamp circuit 170 can subtract the target pixel value Dt and the correction value Sc(x−1) from the pixel value D(x) to obtain the difference value Sd.

In step S908, the clamp circuit 170 compares the difference value Sd with the threshold value B. If the absolute value of the difference value Sd is less than the threshold value B (YES in S908), the clamp circuit 170 determines that the pixel value D(x) is used for updating the correction value Sc, and advances the processing to step S909. On the other hand, if the absolute value of the difference value Sd is equal to or greater than the threshold value B (NO in S908), the clamp circuit 170 determines that the pixel value D(x) is not used for updating the correction value Sc, and advances the processing to step S911.

In step S909, the clamp circuit 170 sequentially updates the correction value Sc(x) in the x-th column based on the correction value Sc(x−1) in the (x−1)-th column. Specifically, similarly to the third embodiment, the clamp circuit 170 can calculate the correction value Sc(x) based on the above equation (4). That is, the clamp circuit 170 can calculate the correction value Sc(x) by adding the difference value Sd obtained in step S907 to the correction value Sc(x−1). The correction value Sc(x) according to the above equation (4) is set as a correction value Sc(x) based on the pixel value of the light-shielded pixel 121 in the x-th column.

In step S910, the clamp circuit 170 sets the correction value Sc(x) calculated in step S909 as an updated correction value Sc. In step S911, the clamp circuit 170 corrects the pixel value D(x) based on the correction value Sc updated in step S910. The clamp circuit 170 subtracts the correction value Sc from the pixel value D(x) to output the pixel value Do(x). Then, the clamp circuit 170 repeats the processing of steps S901 to S911 to start the processing for the next pixel value to be input. After the update of the correction value based on the pixel signals from the light-shielded pixels 121 is completed, the clamp circuit 170 holds the correction value Sc that is updated last in step S909. After the correction value is updated in step S910, the process can be returned to step S901 without executing step S911. If the absolute value of the difference value Sd is equal to or greater than the threshold value B (NO in step S908), the process can be returned to step S901 without executing step S911.

If the count value x indicates a pixel column included in the effective pixel region 110 in step S903 (YES in step S903), the clamp circuit 170 acquires the pixel value D(x) of the effective pixel 111 from the column circuit 140 (step S912). Then, the clamp circuit 170 subtracts the correction value Sc from the pixel value D(x) of the effective pixel 111 (step S911). That is, the clamp circuit 170 corrects an offset of the pixel value D(x) of the effective pixel 111. After correcting the pixel value D(x), the clamp circuit 170 executes the process of step S901 again to start the process for the next pixel value to be input.

In step S902, if the count value x exceeds the total number of pixels k (NO in step S902), the clamp circuit 170 determines that the input of the pixel signals of the scanning row is completed. In step S913, the clamp circuit 170 resets the count value x, and ends the processing of this flowchart. If there is a pixel row to be scanned next, the clamp circuit 170 executes the processing of this flowchart again to correct the pixel value based on the correction value Sc.

According to the present embodiment, different threshold values are assigned to pixel columns of the light-shielded pixels. Therefore, the pixel value of the light-shielded pixel is selected for updating the correction value with higher accuracy, and the pixel value of the effective pixel is corrected by the ideal correction value. Therefore, the photoelectric conversion device according to the present embodiment can further effectively suppress the problem of generation of the horizontal stripe noise due to the white spot noise or the like.

Fifth Embodiment

Figure 10:
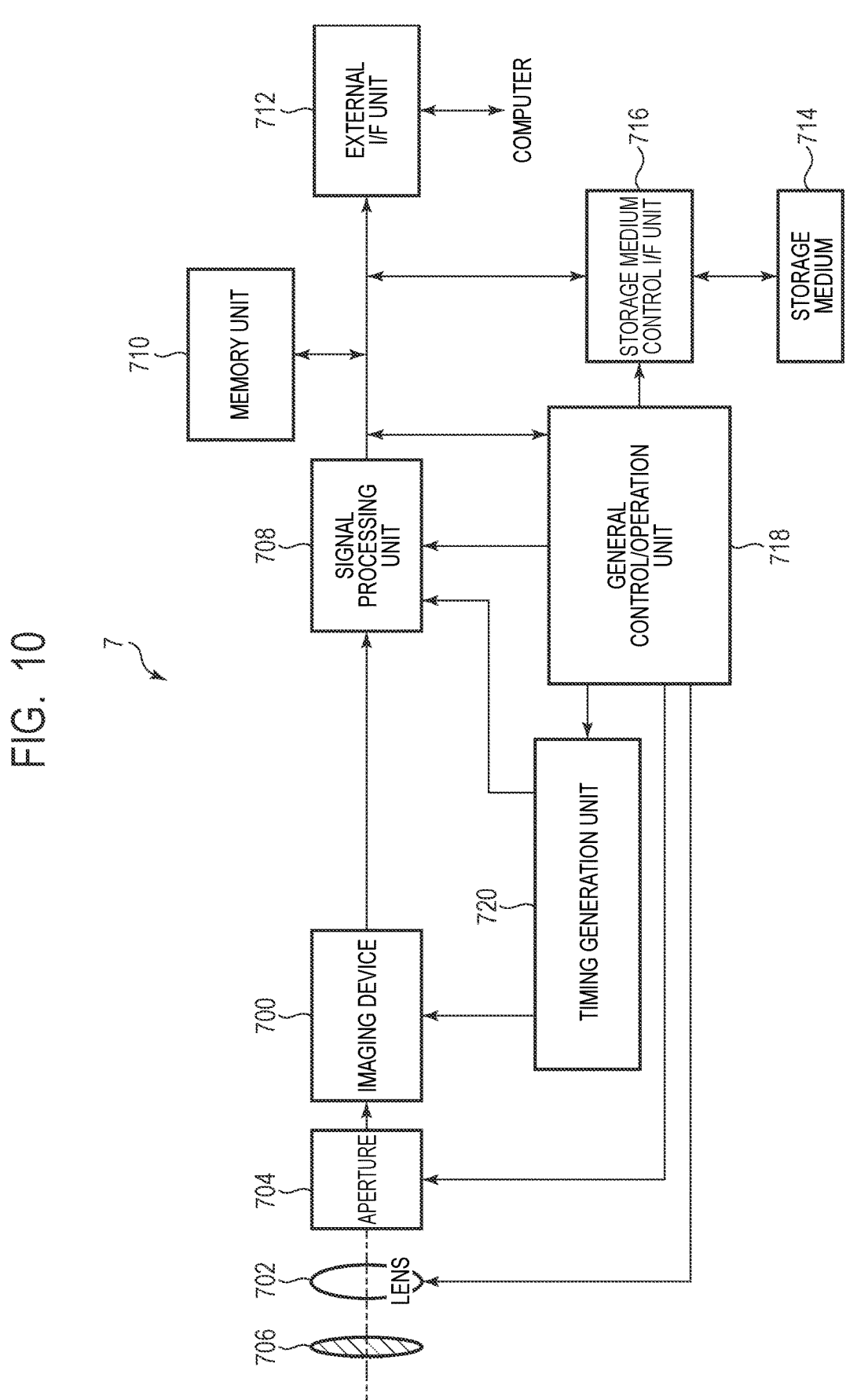
FIG. 10 illustrates a block diagram showing a configuration example of a device according to the fifth embodiment.

The device according to the third embodiment of the present disclosure will be described with reference to FIG. 10. FIG. 10 illustrates a block diagram showing an example of the configuration of an imaging system 7 according to the present embodiment.

The photoelectric conversion apparatus according to the above embodiments is applicable to a variety of devices. The above devices include digital still cameras, digital camcorders, camera heads, copiers, facsimile machines, mobile phones, on-board cameras, observation satellites, and surveillance cameras. FIG. 10 shows a block diagram of a digital still camera as an example of the devices.

The device shown in FIG. 10 includes a barrier 706, a lens 702, an aperture 704, an imaging device (an example of the photoelectric conversion apparatus) 700, a signal processing unit 708, a timing generation unit 720, a general control/operation unit (or control device) 718, a memory unit (or storage device) 710, a storage medium control I/F unit 716, a storage medium 714, and an external I/F unit 712. At least one of the barrier 706, the lens 702, and the aperture 704 is an optical apparatus corresponding to the devices. The barrier 706 protects the lens 702, and the lens 702 forms an optical image of a subject on the imaging device 700. The aperture 704 varies the amount of light passing through the lens 702. The imaging device 700 is configured as described above, and converts an optical image formed by the lens 702 into image data (or image signals). Here, it is assumed that an AD (analog-to-digital) converter is arranged on a semiconductor substrate of the imaging device 700. The signal processing unit 708 compresses various corrections and data to the imaging data output from the imaging device 700. That is, the signal processing unit 708 can be a signal processing device for processing the image signal output from the photoelectric conversion apparatus.

The timing generation unit 720 outputs various timing signals to the imaging device 700 and the signal processing unit 708. The general control/operation unit 718 totally controls the digital still camera, and the memory unit 710 temporarily stores image data. The storage medium control I/F unit 716 is an interface for storing or reading image data in the storage medium 714, and the storage medium 714 is a removable recording medium such as a semiconductor memory for recording or reading image data. The external I/F unit 712 is an interface for communicating with an external computer or the like. A timing signal or the like may be input from the outside of the device. Further, the imaging system 7 may include a display apparatus (monitor, electronic viewfinder, etc.) for displaying information obtained by the photoelectric conversion apparatus. The device includes at least a photoelectric conversion apparatus. In addition, the device includes at least any of machinery or a device operating based on information obtained by optical apparatus, control apparatus, processing apparatus, display apparatus, storage apparatus, and photoelectric conversion apparatus. The machinery or the device is a movable unit (for example, a robot arm) which receives a signal and operates based on the signal that is generated by the photoelectric conversion apparatus.

In the present embodiment, the imaging device 700 and the AD conversion unit are provided on different semiconductor substrates, but the imaging device 700 and the AD conversion unit may be formed on the same semiconductor substrate. The imaging device 700 and the signal processing unit 708 may be formed on the same semiconductor substrate.

Each pixel may also include multiple photoelectric conversion units. The signal processing unit 708 may be configured to process a pixel signal based on charge generated in the first photoelectric conversion unit and a pixel signal based on charge generated in the second photoelectric conversion unit to acquire information of distance from the imaging device 700 to the subject.

Sixth Embodiment

Figure 11A:
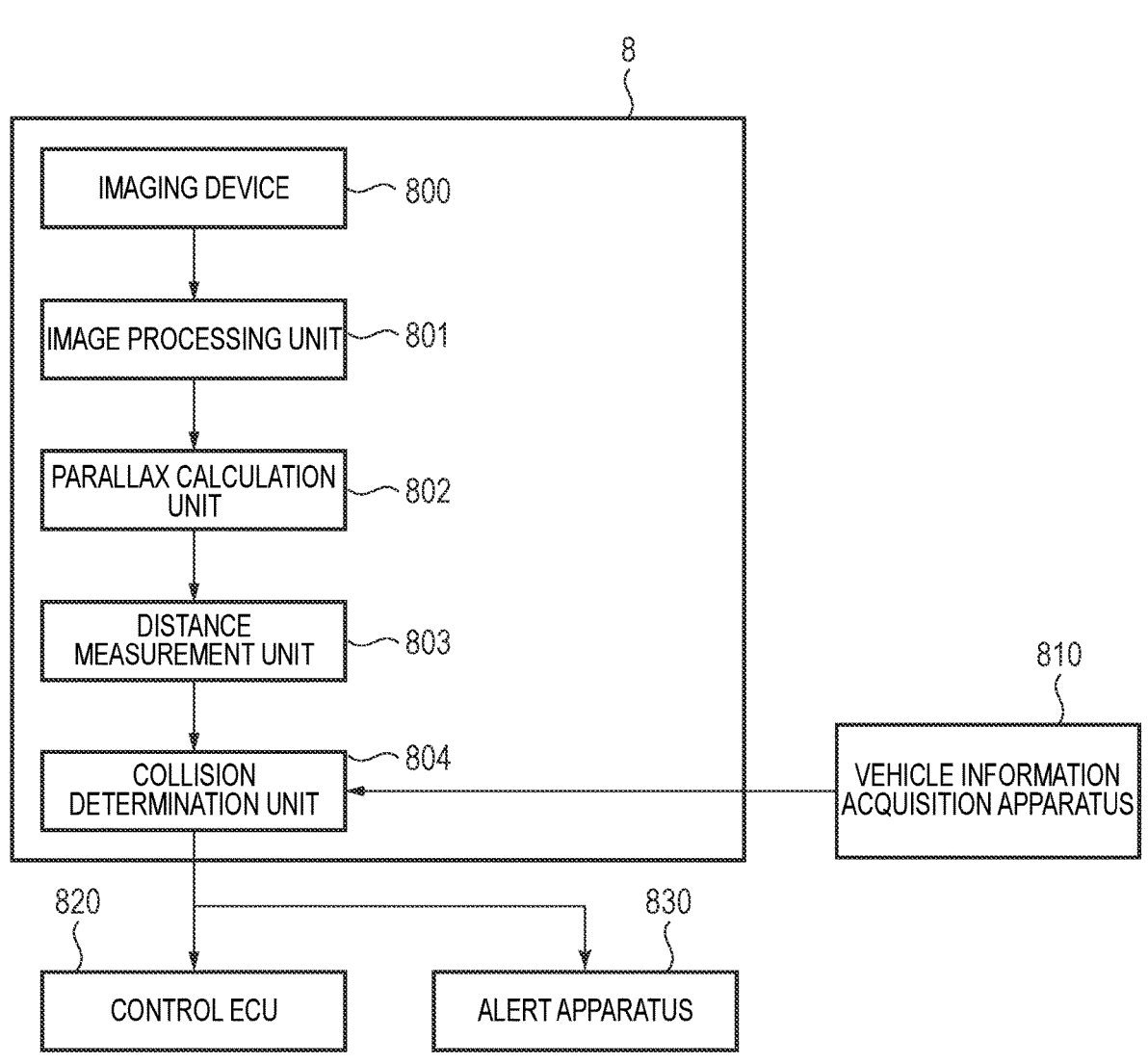
FIG. 11A illustrates a block diagram of equipment relating to a vehicle-mounted camera according to the sixth embodiment.
Figure 11B:
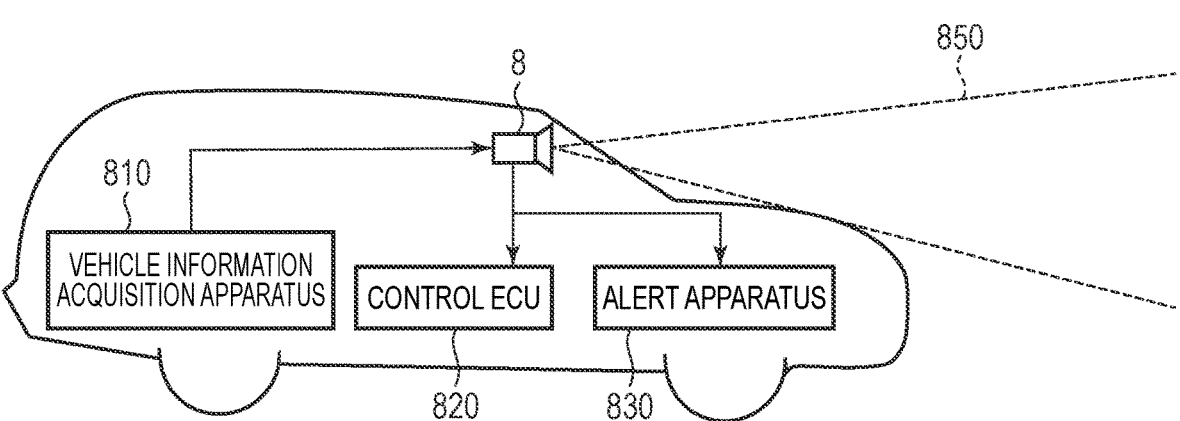
FIG. 11B illustrates a block diagram of equipment relating to a vehicle-mounted camera according to the sixth embodiment.

FIGS. 11A and 11B illustrate block diagrams of a device associated with an on-vehicle camera according to the present embodiment. A device 8 is an example of an imaging system according to the present embodiment and has an imaging device (an example of the photoelectric conversion apparatus) 800 according to the above-described embodiments. The device 8 includes an image processing unit 801 for performing image processing on image data acquired by the imaging device 800, and a parallax calculation unit 802 for calculating parallax (or a phase difference of a parallax image) from image data acquired from the device 8. The device 8 includes a distance measurement unit 803 for calculating a distance to the object based on the calculated parallax, and a collision determination unit 804 for determining whether there is a possibility of collision based on the calculated distance. Here, the image processing unit 801 may be a signal processing device for processing image signals output from the photoelectric conversion apparatus. The parallax calculation unit 802 and the distance measurement unit 803 are examples of distance information acquisition means for acquiring distance information to an object. That is, the distance information is information on parallax, defocus amount, distance to the object, and the like. The collision determination unit 804 may determine the possibility of collision using any of the distance information. The distance information acquisition means may be realized by a dedicated hardware or by a software module. It may be realized by an FPGA (Field Programmable Gate Array), an ASIC (Application Specific Integrated Circuit), or a combination thereof.

The device 8 is connected to a vehicle information acquisition apparatus 810 that can acquire vehicle information such as vehicle speed, yaw rate and steering angle. The device 8 is connected to a control ECU 820 that is a control device for outputting a control signal for generating a braking force to a vehicle based on a determination result made by the collision determination unit 804. The device 8 is also connected to an alert apparatus 830 for giving an alarm to a driver based on the determination result made by the collision determination unit 804. For example, if there is a high possibility of collision according to the collision determination unit 804, the control ECU 820 applies the brake, eases up on or release the accelerator, and suppresses the engine output to avoid the collision and perform vehicle control to reduce the damage. The alert apparatus 830 alerts a user by sounding an alarm such as a sound, displaying alarm information on a screen such as a car navigation system, or applying vibration to a seatbelt or the steering. The device 8 functions as control means for controlling the operation of controlling the vehicle as described above.

In the present embodiment, the periphery of the vehicle, for example, front or rear thereof, is imaged by using the device 8. FIG. 11B illustrates a device for imaging the front (imaging range 850) of the vehicle. The vehicle information acquisition apparatus 810 as imaging control means sends an instruction to the device 8 or to the imaging device 800 to perform the operation described in the above embodiments. With such a configuration, the accuracy of distance measurement can be improved.

Although the example of controlling the vehicle so as not to collide with another vehicle has been described above, the control according to the present disclosure is also applicable for following another vehicle and driving automatically, and for not protruding from the lane. Further, the application of the device is not limited to vehicles such as automobiles, but the device may be also applied to other mobile bodies (mobile apparatuses) such as, for example, ships, aircraft, satellites, industrial robots, and civil robots. In addition, the device may be also applied not only to mobile objects, but also to equipment using the object recognition or the biological recognition, such as intelligent transport systems (ITS), surveillance systems, etc.

Other Embodiments

The present disclosure is not limited to the above-described embodiments, and various modifications are possible. For example, the embodiments of the present disclosure include an example in which some of the configurations of any of the embodiments are added to other embodiments, and an example in which some of the configurations of other embodiments are substituted. For example, the first embodiment and the third embodiment may be combined, and the attenuation coefficient A and the threshold value B may be set in each of the multiple light-shielded pixel regions 120. Further, the second embodiment and the fourth embodiment may be combined to set the attenuation coefficient A and the threshold value B for each pixel column (column address). Alternatively, instead of the difference value Sd, the pixel value of the light-shielded pixel may be compared with the absolute value of a predetermined threshold value, and the correction value of the light-shielded pixel may not be updated if the pixel value exceeds the absolute value of the predetermined threshold value.

According to the present disclosure, it becomes possible to provide a photoelectric conversion device and a photoelectric conversion system capable of performing more proper correction on an image signal.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-024206, filed Feb. 20, 2023, which is hereby incorporated by reference herein in its entirety.

What is claimed is:

1. A photoelectric conversion device comprising:
a pixel array including a plurality of pixels arranged in a matrix form, the plurality of pixels including an effective pixel that outputs a signal corresponding to incident light and a light-shielded pixel having a light-shielding member;
a calculation unit that calculates a correction value based on a pixel value of the light-shielded pixel; and
a correction unit that corrects a pixel value of the effective pixel based on the correction value,
wherein a pixel row of the pixel array includes a first light-shielded pixel, a second light-shielded pixel, and the effective pixel,
wherein the calculation unit calculates the correction value using different parameters for each of the first light-shielded pixel and the second light-shielded pixel in the pixel row, and
wherein the correction unit corrects an offset of the pixel value of the effective pixel based on the correction value.

2. The photoelectric conversion device according to claim 1, wherein the pixel row includes:
a pixel region having the first light-shielded pixels; and
a pixel region having the second light-shielded pixels.

3. A photoelectric conversion system comprising:
the photoelectric conversion device according to claim 1; and
a signal processing device that processes an image signal output from the photoelectric conversion device.

4. A photoelectric conversion device comprising:
a pixel array including a plurality of pixels arranged in a matrix form, the plurality of pixels including an effective pixel that outputs a signal corresponding to incident light and a light-shielded pixel having a light-shielding member;
a calculation unit that calculates a correction value based on a pixel value of the light-shielded pixel; and
a correction unit that corrects a pixel value of the effective pixel based on the correction value,
wherein a pixel row of the pixel array includes a first light-shielded pixel, a second light-shielded pixel, and the effective pixel,
wherein the calculation unit calculates the correction value using different parameters for each of the first light-shielded pixel and the second light-shielded pixel in the pixel row, and
wherein the correction unit sequentially inputs the pixel values of the light-shielded pixels included in the pixel row, and updates the correction value using each light-shielded pixel.

5. The photoelectric conversion device according to claim 4, wherein the calculation unit updates, based on a pixel value of the second light-shielded pixel, the correction value calculated based a pixel value of the first light-shielded pixel, and
wherein the correction unit corrects the pixel value of the effective pixel included in the pixel row using the updated correction value.

6. The photoelectric conversion device according to claim 4, wherein a pixel value of the second light-shielded pixel is input to the calculation unit after inputting a pixel value of the first light-shielded pixel, and wherein a pixel value of the effective pixel is input to the correction unit after inputting the pixel value of the second light-shielded pixel to the calculation unit.

7. The photoelectric conversion device according to claim 6, wherein the parameter is an attenuation factor to attenuate a difference between the updated correction value and the correction value before the update, and wherein the attenuation factor for the second light-shielded pixel used to update the correction value is greater than the attenuation factor for the first light-shielded pixel used to update the correction value.

8. The photoelectric conversion device according to claim 6, wherein the calculation unit does not update the correction value using the light-shielded pixel in a case where a pixel value of said light-shielded pixel exceeds an absolute value of a predetermined threshold value.

9. The photoelectric conversion device according to claim 8, wherein the parameter is the threshold value, and wherein an absolute value of the threshold value for the second light-shielded pixel is smaller than an absolute value of the threshold value for the first light-shielded pixel.

10. The photoelectric conversion device according to claim 6, wherein a correction value Sc(x) is calculated based on the following equations:

$$Sc(x) = Sc(x - 1) + Sd \times A; \text{ and}$$

$$Sd = D(x) - Dt - Sc(x - 1),$$

where:

D(x) is a pixel value of the light-shielded pixel in an x-th column of the pixel row;

Sc(x) is a correction value for the light-shielded pixel in the x-th column;

Sc(x−1) is a correction value for the light-shielded pixel in a (x−1)-th column;

Dt is a target pixel value;

A is a coefficient corresponding to the parameter; and

Sd is a difference value.

11. The photoelectric conversion device according to claim 10, wherein the parameter is the coefficient A, and wherein the coefficient A in a case where the light-shielded pixel in the x-th column is the first light-shielded pixel is greater than the coefficient A in a case where the light-shielded pixel in the x-th column is the second light-shielded pixel.

12. The photoelectric conversion device according to claim 11, wherein, in a case where the light-shielded pixels are arranged from an x1-th column to an x2-th column in the pixel row, the coefficient A for the light-shielded pixel in the x-th column is calculated based on the following equation:

$$A = (x2 - x)/(x2 - x1).$$

13. The photoelectric conversion device according to claim 10, wherein the calculation unit does not update the correction value using the light-shielded pixel in a case where an absolute value of the difference value exceeds a predetermined threshold value.

14. The photoelectric conversion device according to claim 13, wherein the parameter is the threshold value, and wherein the threshold value for the second light-shielded pixel is smaller than the threshold value for the first light-shielded pixel.

15. The photoelectric conversion device according to claim 14, wherein, in a case where the light-shielded pixels are arranged from an x1-th column to an x2-th column in the pixel row and a greatest value of the threshold value is represented as b, a coefficient B for the light-shielded pixel in the x-th column is calculated based on the following equation:

$$B = b \times (x2 - x)/(x2 - x1).$$

16. A photoelectric conversion system comprising:

the photoelectric conversion device according to claim 4; and a signal processing device that processes an image signal output from the photoelectric conversion device.

17. A photoelectric conversion system comprising:

a photoelectric conversion device; and a signal processing device that processes an image signal output from the photoelectric conversion device, wherein the photoelectric conversion device comprises:

a pixel array including a plurality of pixels arranged in a matrix form, the plurality of pixels including an effective pixel that outputs a signal corresponding to incident light and a light-shielded pixel having a light-shielding member;

a calculation unit that calculates a correction value based on a pixel value of the light-shielded pixel; and a correction unit that corrects a pixel value of the effective pixel based on the correction value, wherein a pixel row of the pixel array includes a first light-shielded pixel, a second light-shielded pixel, and the effective pixel, wherein the calculation unit calculates the correction value using different parameters for each of the first light-shielded pixel and the second light-shielded pixel in the pixel row, and wherein the signal processing device processes the respective image signals generated in the multiple photoelectric conversion devices, and obtains information of a distance from the photoelectric conversion device to a subject.

18. A method of processing a signal output from a pixel array including a plurality of pixels arranged in a matrix form, the plurality of pixels including an effective pixel outputting a signal corresponding to incident light and a light-shielded pixel having a light-shielding member, a pixel row of the pixel array including a first light-shielded pixel, a second light-shielded pixel, and the effective pixel, the method comprising:

calculating a correction value based on a pixel value of the light-shielded pixel; and correcting a pixel value of the effective pixel based on the correction value, wherein the calculating includes calculating the correction value using different parameters for each of the first light-shielded pixel and the second light-shielded pixel in the pixel row, and wherein the correcting includes correcting an offset of the pixel value of the effective pixel based on the correction value.

19. A method of processing a signal output from a pixel array including a plurality of pixels arranged in a matrix form, the plurality of pixels including an effective pixel outputting a signal corresponding to incident light and a light-shielded pixel having a light-shielding member, a pixel row of the pixel array including a first light-shielded pixel, a second light-shielded pixel, and the effective pixel, the method comprising:

calculating a correction value based on a pixel value of the light-shielded pixel; and correcting a pixel value of the effective pixel based on the correction value, wherein the calculating includes calculating the correction value using different parameters for each of the first light-shielded pixel and the second light-shielded pixel in the pixel row, and wherein the correcting includes sequentially inputting the pixel values of the light-shielded pixels included in the pixel row, and updates the correction value using each light-shielded pixel.

* * * * *